United States Patent
Milton et al.

(10) Patent No.: US 7,337,402 B2
(45) Date of Patent: Feb. 26, 2008

(54) TUNABLE INFORMATION PRESENTATION APPLIANCE USING AN EXTENSIBLE MARKUP LANGUAGE

(75) Inventors: Victoria E. Milton, Woodinville, WA (US); Vladimir Sadovsky, Bellevue, WA (US); Oren Rosenbloom, Redmond, WA (US); Dennis Stewart W. Tansley, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 404 days.

(21) Appl. No.: 10/037,242

(22) Filed: Nov. 9, 2001

(65) Prior Publication Data

US 2003/0117433 A1    Jun. 26, 2003

(51) Int. Cl.
*G06F 3/00*    (2006.01)
(52) U.S. Cl. ............... 715/730; 710/8; 715/760
(58) Field of Classification Search ........... 345/760; 710/8; 715/760, 720, 721, 730, 731, 732; 725/25, 28, 23
See application file for complete search history.

(56) References Cited

U.S. PATENT DOCUMENTS

| | | | |
|---|---|---|---|
| 5,636,211 A * | 6/1997 | Newlin et al. | 370/465 |
| 5,748,980 A * | 5/1998 | Lipe et al. | 710/8 |
| 5,912,696 A * | 6/1999 | Buehl | 725/28 |
| 6,711,630 B2 * | 3/2004 | Dubal et al. | 710/8 |
| 6,725,281 B1 * | 4/2004 | Zintel et al. | 719/318 |
| 6,732,367 B1 * | 5/2004 | Ellis et al. | 725/27 |
| 6,771,317 B2 * | 8/2004 | Ellis et al. | 348/569 |
| 2006/0288366 A1 * | 12/2006 | Boylan et al. | 725/42 |

OTHER PUBLICATIONS

Richard, Gonden G., Service Advertisement and Discovery, IEEE Internet Comoputing, Sep.-Oct. 2000, all.*
Milton, V., UPnP and Imaging in the Windows® Environment downloaded from http://www.upnp.org/presents/fourthsummit/upnpandImaginginaWindowsEnvironment.ppt downloaded on Aug. 29, 2001; Nov. 9, 2000.
UPnP Device Architecture downloaded from http://www.upnp.org/download/UPnP_Device_Architecture_Generic_20000710.ppt, Jun. 13, 2000.
Platform SDK: Universal Plug and Play, pp. 1-86, Feb. 2001.
Understanding Universal Plug and Play, pp. 1-39, Jun. 2000.
XML Schema Part 0: Primer downloaded from http://www.w3.org/TR2001/REC-xmlschema-0-20010502/, pp. 1-66, May 2, 2001.
Universal Plug and Play Device Architecture downloaded from www.upnp.org/download/upnpda10_20000613.html, pp. 1-53, Jun. 8, 2000.

* cited by examiner

*Primary Examiner*—John Cabeca
*Assistant Examiner*—Dennis G. Bonshock
(74) *Attorney, Agent, or Firm*—Lee & Hayes, PLLC

(57) ABSTRACT

The Universal Plug and Play architecture contemplates devices and control points that can automatically integrate themselves into a network and provide functionality to a user. Extensions are provided that allow an information presentation appliance to identify categories of information the user wishes that appliance to display. The appliance, acting as a device, can advertise functionality that only allows for the display of information that matches the categories selected by the user. Alternatively, the appliance can act as a control point and request information from information storage devices that matches the categories selected by the user. Using either alternative, the user is allowed to tune, at the appliance, the information that the appliance presents.

37 Claims, 7 Drawing Sheets

TUNABLE INFORMATION PRESENTATION APPLIANCE USING AN EXTENSIBLE MARKUP LANGUAGE

TECHNICAL FIELD

The invention relates generally to providing a mechanism to allow a user to tune an information presentation appliance and, more particularly, relates to extending a profile of a self-configuring information presentation appliance through the use of an extensible markup language.

BACKGROUND OF THE INVENTION

An increasing number of common household items are evolving into computing machines capable of network communication. The goal of such an evolution is to allow appliances throughout a home to communicate with one another so that the user can simplify his or her lifestyle. For example, many common household items, including ovens, microwaves, video devices, radios and alarm clocks each contain a time display. However, because such appliances cannot currently communicate with one another, the user is forced to set the correct time on each appliance. Inter-appliance communication would allow a single appliance to share the correct time with all of the other appliances, minimizing the effort on the part of the user. Such efficiencies, however, require creating and managing a communications network connected to many different appliances.

To ease the burden of setting up a communication-capable appliance and integrating it into such a network, a number of technologies and protocols have been developed which allow appliances to configure themselves. One such technology is known as Universal Plug and Play (UPnP) and defines a mechanism by which an appliance can automatically learn of other appliances and integrate itself into the network. The UPnP architecture defines two categories for appliances: a "device" category, containing those appliances which can receive instructions and perform functions, and a "control point" category for those appliances which can send instructions and thereby control devices. A UPnP device can advertise the "services" it is capable of performing by broadcasting a message throughout the communication network to which it is attached. The message containing the services can be detected by a UPnP control point and, if the control point is interested in the services exposed by the device, it can query the device for further information regarding those services and learn how to control those services.

From the perspective of the user, UPnP devices and control points are setup-free: the user merely plugs them into the communication network, and the appliances configure themselves. Thus, a user having a UPnP compliant oven, microwave, video device, radio and alarm clock need not spend the time and effort to determine the correct time and set the time on each appliance. Instead the user can simply attach a control point, such as a personal computer, and the control point will learn of each device connected to the communication network. A single instruction from the user to a control point can be used to set the correct time on each device, saving the user from the burden of setting each separately.

However, the current UPnP implementation does not provide any mechanism by which a device or control point can automatically tune or filter the information it displays to the user. For example, a device is limited by its functionality to displaying whatever information it is provided by a control point. Thus, an LCD picture frame, for example, will display all of the pictures sent to it by a control point, and a speaker, such as a radio or stereo system, will play whatever audio data it receives from a control point. A control point will allow user control over the pictures sent to the picture frame or the audio sent to the speaker, for example, but it requires the user to perform the filtering. Thus, a user seeking to send one set of pictures to an electronic picture frame in a home office, and another set to an electronic picture frame in a family room must explicitly define each set at the control point and direct each set to a particular picture frame. If the user subsequently moves the picture frame from the home office into the bedroom, the user is forced to explicitly define a new picture set for the bedroom at the control point, and direct it to the picture frame now located there. Similarly, if the user has a personal computer set up as a control point, with a broadband connection to a network such as the Internet, through which the user receives digital radio stations, the user will be forced to select the radio stations played by the speaker at the control point instead of at the speaker. Ultimately, the user is continually forced to perform any tuning of the content presented on their own and only at the control point.

SUMMARY OF THE INVENTION

The present invention, therefore, is directed to a method, system, and apparatus which allow a user to tune the content presented on an intelligent information presentation appliance.

The present invention is also directed to a method, system, and apparatus which allow appliances that traditionally acted as devices to act as control points within the UPnP network structure.

The present invention is additionally directed to a method, system, and apparatus which allow the definition of a device or a control point within the UPnP network structure to be extended via an extensible markup language such as XML.

The present invention provides a tuning capability for information presentation appliances by extending the definition of the appliance, whether it is a UPnP device or control point. The appliance can contain a user interface, in either hardware or software, for tuning the information presented by the appliance. An extension to a standardized XML schema is contemplated, wherein the additional elements represent categories of information from which the user can select. In such a manner, the user's tuning can be transmitted through XML pages which remain backwards compatible. If the appliance is a control point, the user's tuning can be detected and represented in an extended XML schema so that the control point can instruct information sources, such as compatible Internet radio station servers or image servers, to send only specific categories of information reflecting the user's tuning. If the appliance is a device, it can advertise its methods, through an extended XML schema, as being capable of presenting only those categories of information reflecting the user's tuning. To devices and control points which do not contain the functionality of the present invention, the extensions to the XML schemas contemplated by the present invention are ignored, thereby ensuring backwards compatibility with older devices.

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
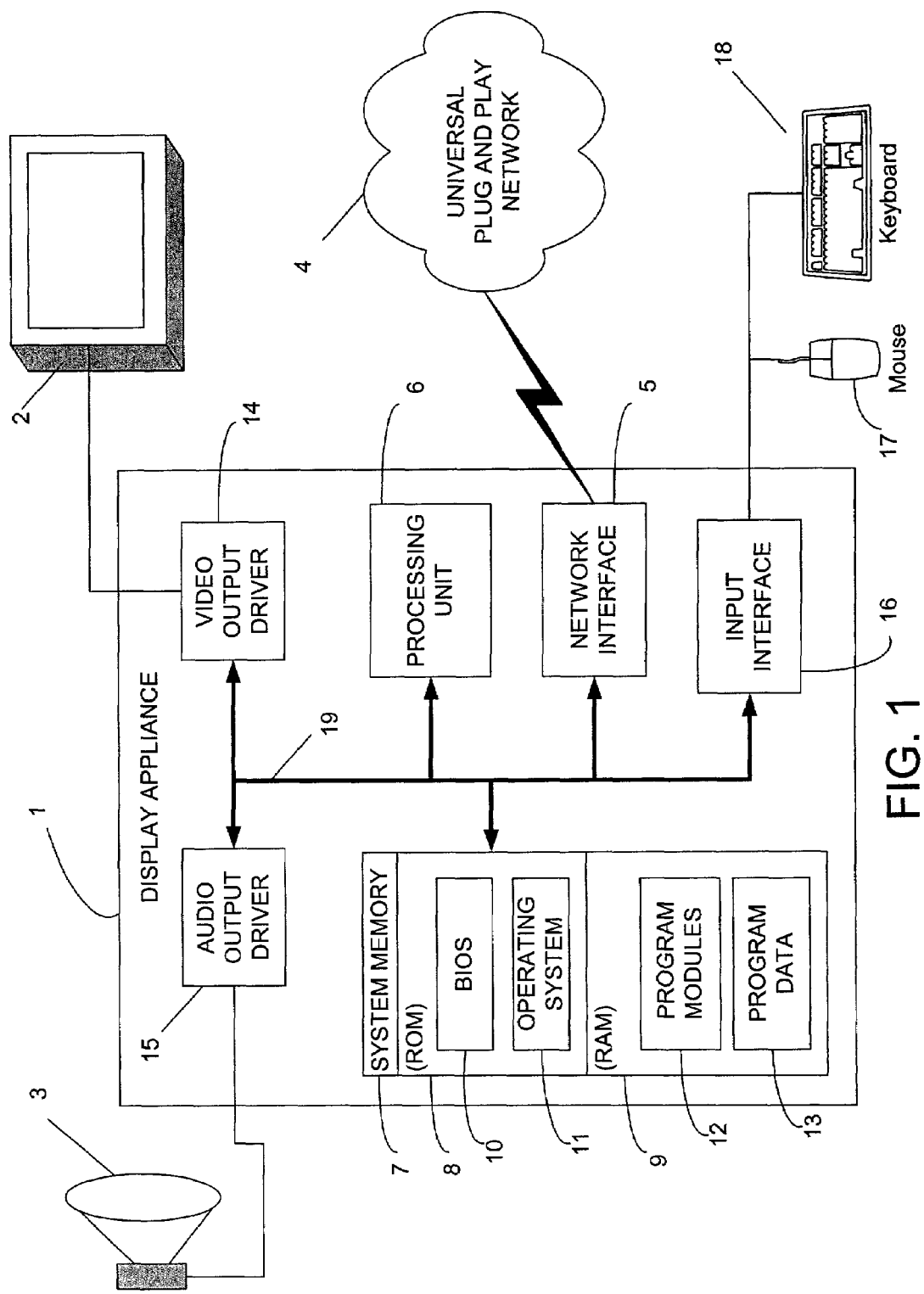
FIG. 1 is a block diagram generally illustrating an exemplary display apparatus for use with the present invention.

The present invention is directed to a method, system, and apparatus for providing tuning ability to appliances which present content to a user. A audio and/or video presentation appliance, such as an electronic picture frame (EPF), television, decoder device, set-top box, stereo system, radio, and the like, can be directly tuned by a user through the selection of categories of information presented through a user interface. Following a standard Universal Plug and Play (UPnP) architecture, the present invention contemplates extensions to the eXtensible Markup Language (XML) schemas used to define a device and the services exposed by that device. A control point can use these extensions to determine the categories of information which can be presented to the user through the device. The user can then select from amongst these categories, thereby tuning the information presentation appliance. Alternatively, the user can select from a predefined set of categories and the device can create a device description that advertises the device as capable of presenting the selected categories. The device will, thereby, receive only those categories of information from an information store at a control point, or through a control point. In either case, the user is not required to pre-define the information that can be delivered to an information presentation appliance from an information store, but can tune the appliance as desired.

Turning to the drawings, wherein like reference numerals refer to like elements, the invention is illustrated as being implemented in a suitable computing environment. Although not required, the invention will be described in the general context of computer-executable instructions, such as program modules, being executed by a computing device. Generally, program modules include routines, programs, objects, components, data structures, etc. that perform particular tasks or implement particular abstract data types. Moreover, those skilled in the art will appreciate that the invention may be practiced with many different computer system configurations, including hand-held devices, multi-processor systems, microprocessor based or programmable consumer electronics, network PCs, minicomputers, mainframe computers, intelligent appliances, and the like. The invention may also be practiced in distributed computing environments where tasks are performed by remote processing devices that are linked through a communications network. In a distributed computing environment, program modules may be located in both local and remote memory storage devices.

FIG. 1 illustrates an example of an intelligent appliance for use with the present invention. An information presentation appliance 1 can either present information to a user through a video device 2 or a sound device 3. The video device can be a television, an LCD panel, an EPF, a projection screen, or the like. Similarly, the sound device 3 can be a speaker, a stereo system, a radio, or other sound transducer. While it is possible that a single information presentation appliance 1 can have both audio and video output, such as a television set, it is also contemplated that the information presentation appliance can have only one, such as a simple, low-cost, EPF. Furthermore, it is not intended that the present invention be limited to information presentation appliances which can only deliver information through sound or audio. For example, an information presentation appliance 1 can be a decoder device or set-top box. As is know by one of skill in the art, such devices do not provide direct audio or video output to a user, but instead decode one signal and present it in another format to another information presentation appliance. The present invention contemplates information presentation appliances, such as decoder devices, or set-top boxes, which can receive information over a network, as will be described in detail below, and present it in a common format, such as an interlaced video stream, or an pre-amplified audio stream to a less sophisticated information presentation appliance, such as a common TV or stereo system.

The information presentation appliance 1 can be connected to a UPnP network 4, which will be described in further detail below, through a network interface 5. A processing unit 6 can perform the steps required by the present invention and, in the process, can use the system memory 7, which can be volatile and/or nonvolatile memory such as read only memory (ROM) 8 and random access memory (RAM) 9. A basic input/output system (BIOS) 10, can contain the basic routines that help to transfer information between elements within the information presentation appliance 1, such as when the appliance is turned on or plugged into an electrical outlet. Such BIOS 10 is typically stored in ROM 8, together with a minimal operating system 11 which can contain the necessary interfaces to enable the operation of higher level programs or instructions. RAM 9 typically contains data and/or program modules that are immediately accessible to and/or presently being operated on by processing unit 6. The program modules 12 and program data 13 can contain the necessary information to operate the appliance 1, and enable the appliance to communicate over the network 4.

As the invention is directed to the ability of a user to tune the content which is displayed by an appliance, such as information presentation appliance 1, the information presentation appliance can contain an input interface 16 for accepting user input. A variety of user input devices can be used, such as a mouse 17, a keyboard 18, or built-in devices, such as a touch-screen or a jog-dial, not shown. Generally, the type of input device will be determined by the intended use of the information presentation appliance 1, and its target cost. The input interface 16 can communicate with the other elements of the information presentation appliance 1 though a system bus 19. The system bus 19 can be any type of bus structure including a memory bus or memory controller, a peripheral bus, and a local bus using any of a variety of bus architectures, including wire-based and wireless architectures.

Figure 2:
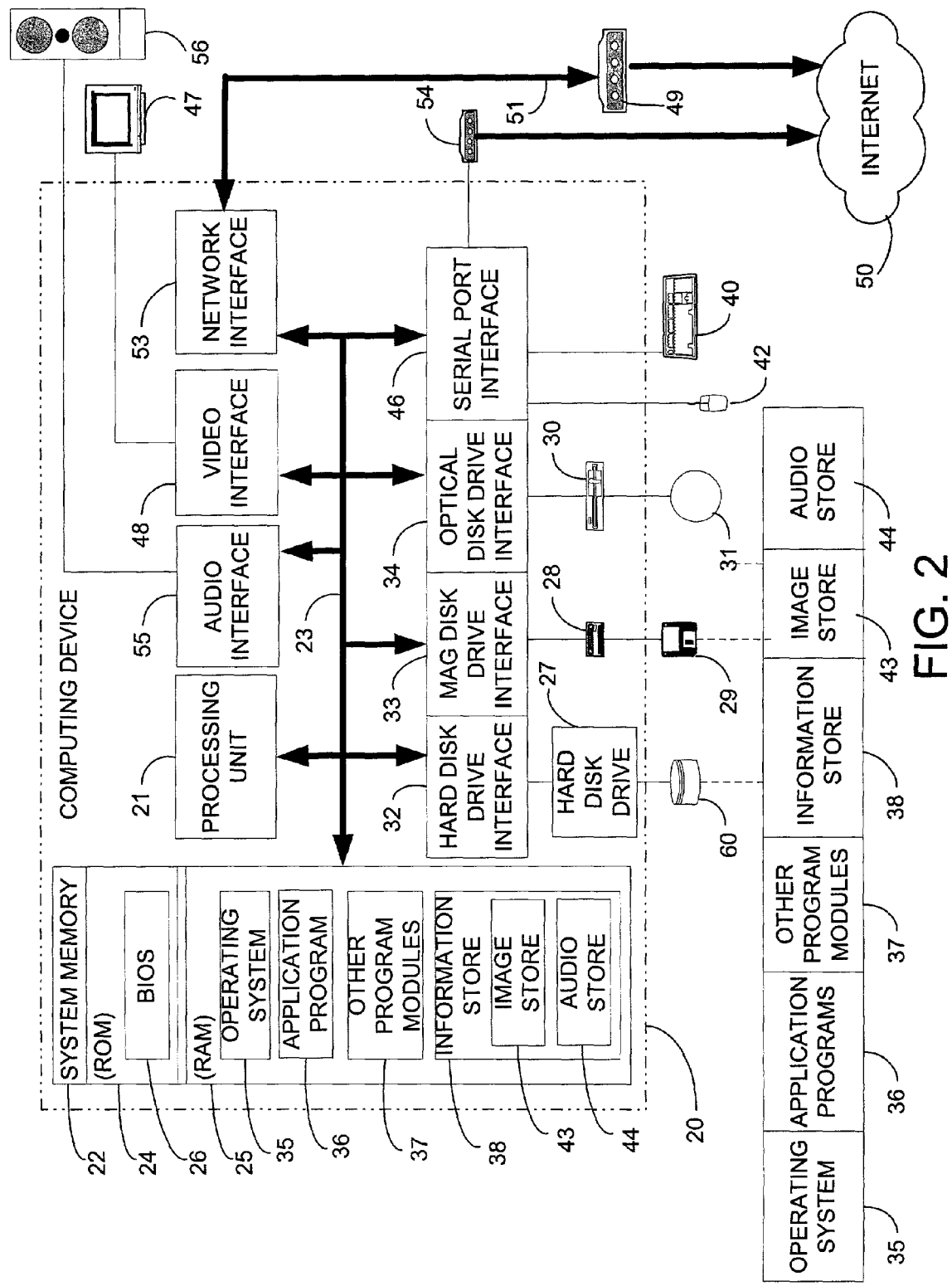
FIG. 2 is a block diagram generally illustrating an exemplary computing device for use with the present invention.

FIG. 2 illustrates an example of a suitable computing device 20 with which the invention may be implemented. The computing device 20 is only one example of a suitable computing environment and is not intended to suggest any limitation as to the scope of use or functionality of the invention. Neither should the computing device 20 be interpreted as having any dependency or requirement relating to any one or combination of components illustrated in the exemplary computing device 20. Components of the computing device 20 may include, but are not limited to, a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures including wire-based and wireless architectures. By way of example, and not limitation, such architectures include Industry Standard Architecture (ISA) bus, Micro Channel Architecture (MCA) bus, Enhanced ISA (EISA) bus, Video Electronics Standards Associate (VESA) local bus, and Peripheral Component Interconnect (PCI) bus also known as Mezzanine bus.

Computing device 20 typically includes a variety of computer readable media. Computer readable media can be any available media that can be accessed by computing device 20 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 20. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 22 includes computer storage media in the form of volatile and/or nonvolatile memory such as ROM 24 and RAM 25. A BIOS 26, containing the basic routines that help to transfer information between elements within computing device 20, such as during start-up, is typically stored in ROM 24. RAM 25 typically contains data and/or program modules that are immediately accessible to and/or presently being operated on by processing unit 21. By way of example, and not limitation, FIG. 2 illustrates operating system 35, application programs 36, other program modules 37, and information storage 38, which can include such items as a collection of images 43 or a collection of audio files 44.

The computing device 20 may also include other removable/non-removable, volatile/nonvolatile computer storage media. By way of example only, FIG. 2 illustrates a hard disk drive 27 that reads from or writes to non-removable, nonvolatile magnetic media such as hard disk 60, a magnetic disk drive 28 that reads from or writes to a removable, nonvolatile magnetic disk 29, and an optical disk drive 30 that reads from or writes to a removable, nonvolatile optical disk 31 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 27 is typically connected to the system bus 23 through a non-removable memory interface such as interface 32, and magnetic disk drive 28 and optical disk drive 30 are typically connected to the system bus 23 by a removable memory interface, such as magnetic disk drive interface 33 and optical disk drive interface 34.

The drives and their associated computer storage media discussed above and illustrated in FIG. 2, provide storage of computer readable instructions, data structures, program modules and other data for the computing device 20. In FIG. 2, for example, hard disk 60 is illustrated as storing operating system 35, application programs 36, other program modules 37, and information store 38. A user may enter commands and information into the computing device 20 through input devices such as a keyboard 40 and pointing device 42, commonly referred to as a mouse, trackball or touch pad. Other input devices (not shown) may include a button, microphone, joystick, game pad, satellite dish, scanner, or the like. These and other input devices are often connected to the processing unit 21 through a user input interface 46 that is coupled to the system bus, but may be connected by other interface and bus structures, such as a parallel port, game port or a universal serial bus (USB). A monitor 47 or other type of video presentation appliance can also connected to the system bus 23 via an interface, such as a video interface 48, and a computer speaker 56 or other type of audio presentation appliance can be connected to the system bus 23 via an interface, such as an audio interface 55. In addition to the monitor and speaker, computing devices may also include other peripheral output devices, such as printers, which are not shown.

The computing device 20 may operate in a networked environment using logical connections to one or more remote computers. The logical connections depicted in FIG. 2 include a local area network (LAN) 51 and a wide area network (WAN) in the form of Internet 50, but may also include other networks, such as intranets, and are not meant to be limited to networks using TCP/IP communication. When used in a LAN networking environment, the computing device 20 is connected to the LAN 51 through a network interface or adapter 53. The computing device 20 shown in FIG. 2 is networked, via LAN 51, to a broadband modem 49, such as a cable modem, a Digital Subscriber Line (DSL) modem, satellite modem, or the like. A broadband modem 49 connected to the LAN 51 allows multiple computing devices to share the same broadband connection, allowing more users faster access to WANs such as Internet 50. Alternatively, the computing device 20 can include a modem 54 or other means for establishing communications over the WAN, such as the Internet 50. The modem 54, which may be internal or external, may be connected to the system bus 23 via the serial port interface 46. In a networked environment, program modules depicted relative to the computing device 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computer, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Figure 3:
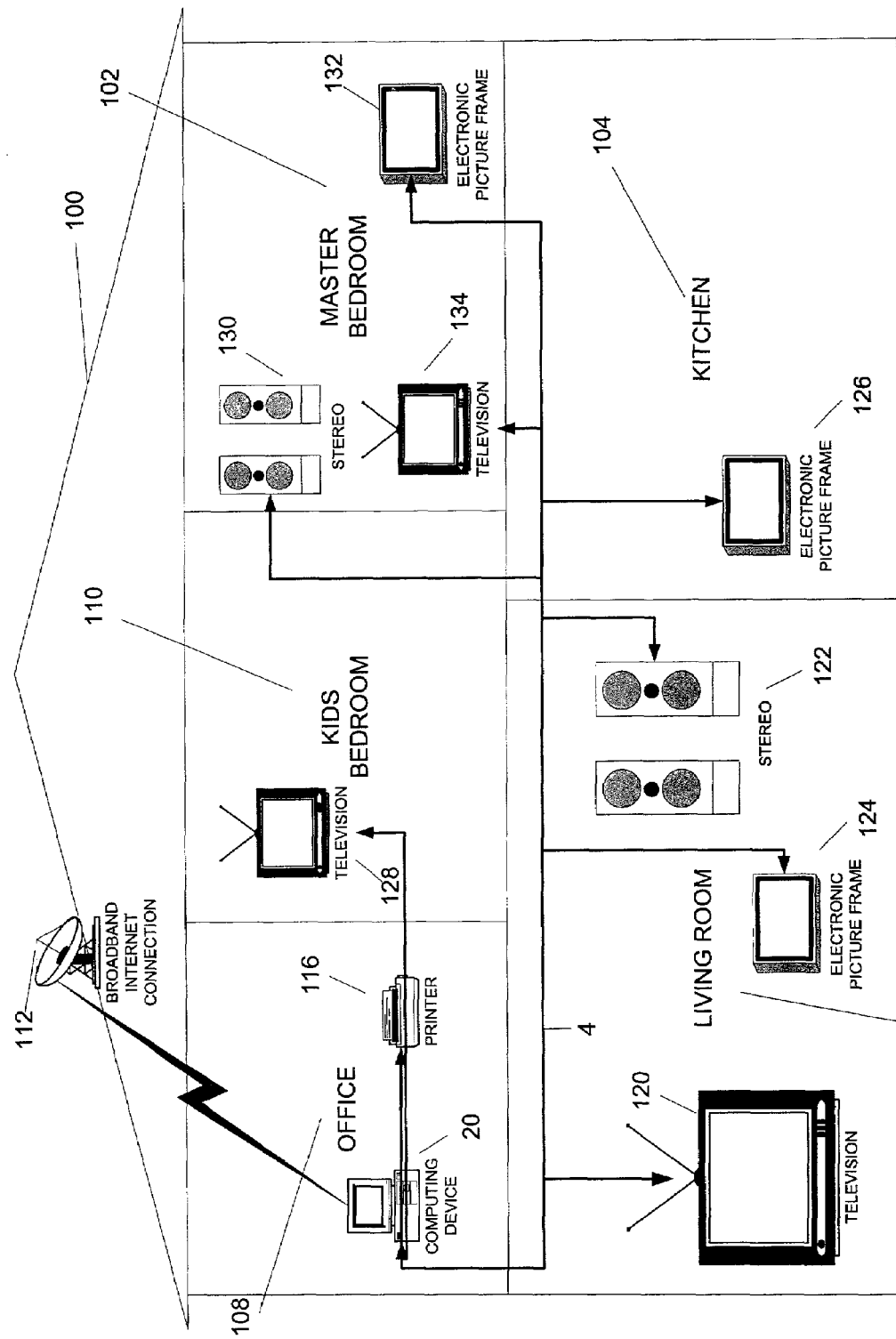
FIG. 3 is a cross-sectional diagram generally illustrating a home in which the present invention can be used.

Turning to FIG. 3, the operation of a Universal Plug and Play (UPnP) network 4 can be illustrated in the context of an average home 100, having a master bedroom 102, a kitchen 104, a living room 106, an office 108, and a kids bedroom 110. The UPnP network 4 can be connected to appliances through various different ports. For example, computing device 20 can be connected to the UPnP network 4 through the network interface 53 or the serial port interface 46. One preferred embodiment uses network interface 53 to connect the computing device 20 to the UPnP network 4 because the network interface 53 provides efficient throughput of data using the standard networking protocols relied on by the UPnP architecture, as explained below. Alternatively, the UPnP network 4 can also be connected to computing device 20 through the video interface 48 or the audio interface 55, for networking presentation appliances which can present video or audio data, respectively. The computing device 20 can maintain a connection to the Internet 50, through a broadband connection 112, and can share the connection 112 through the UPnP network 4. The broadband connection 112 can use a broadband modem 49, or other broadband connection hardware. Additional devices or control points can be attached to the network 4, and can share the resources of the other devices or control points.

As will be known by those of skill in the art, the UPnP Architecture, as expressed in The Universal Plug and Play Device Architecture Version 1.0, incorporated herein by reference in its entirety, defines UPnP compliant appliances as either "devices" or "control points." A UPnP device advertises its abilities and is controlled by a control point, while a control point listens or searches for devices it is capable of controlling. The office 108 contains the computing device 20, which often acts as a control point. The computing device 20 searches for, and listens to, devices on the UPnP network 4. An exemplary UPnP device can be a printer 116 attached to the network 4. When the printer 116 is initially connected, it advertises its services, such as printing, form feeding, envelope feeding, and the like. The control point, in the form of computing device 20, listens for such advertisements, and when they are received, responds with a request for further information if the control point is interested in the service advertised by the device.

The UPnP architecture relies on well known networking protocols, such as the Transfer Control Protocol (TCP), the Internet Protocol (IP) and the HyperText Transfer Protocol (HTTP). Thus, when the printer 116 advertises its services, it sends a file through HTTP using a markup language. The eXtensible Markup Language (XML) can be used by the UPnP architecture to transmit information between devices and control points. The file sent by the printer 116 to advertise its services can be a page written in XML, specifying information about the printer, the services it provides, and the address of additional pages of information regarding each of the services advertised. In such a manner, the control point need only issue the well known HTTP "get" request on one of the pages specified by the printer 116 to obtain further information and learn how to control the printer.

Table 1 below illustrates a sample XML page that could be sent by printer 116 to advertise its services. As will be known by those skilled in the art, XML classifies data contained within the document by using tags, which are identified by brackets. For example, a <device> tag indicates the beginning of a set of data about a device, and a </device> tag indicates the end of the set of data about the device. Because XML is extensible, new tags can be defined through an XML schema, as will be described further below. An XML document, such as that shown in Table 1, can reference an appropriate schema in order to provide a context and meaning for the tags used in the document. The first two lines of Table 1, for example, identify the version of XML used, and the schema document that provides the definitions of the tags used.

The "device" element in Table 1, identified and bounded by the <device> and </device> tags, contains the description of the printer 116 and can contain a number of sub-elements which provide the structure through which the printer can advertise itself and its services. For example, the "manufacturer" sub-element can provide the name of the manufacturer of the printer, the "modelName" sub-element can provide a model name the printer was assigned by its manufacturer, and the "modelNumber" sub-element can provide a model number which was assigned to the printer. The "device" element also contains the "serviceList" sub-element, which can list services offered by printer 116 through further sub-element "service". Table 1 illustrates one "service" element used to provide information on the printing service. The "service" element, in turn, has sub-elements which can define a service identifier (the "serviceId" sub-element), a Uniform Resource Locator (URL) of a page with more information about the service (the "SCPDURL" sub-element), and a URL of a page which can be used to control the service (the "controlURL" sub-element). Additional services can be listed under the "serviceList" element through the use of more "service" sub-elements as shown in Table 1 below.

TABLE 1

```xml
<?xml version="1.0"?>
<root xmlns="urn:schemas-upnp-org:device-1-0">
    <specVersion>
        <major>1</major>
        <minor>0</minor>
    </specVersion>
    <device>
        <deviceType>urn:schemas-upnp-org:device:printer:1</deviceType>
        <friendlyName>Printer</friendlyName>
        <manufacturer>PrinterCo</manufacturer>
        <manufacturerURL>http://www.printerco.com</manufacturerURL>
        <modelDescription>Ink Jet Printer</modelDescription>
        <modelName>JetPrint</modelName>
        <modelNumber>100</modelNumber>
        <modelURL>http://www.printerco.com/jetprint100.html</modelURL>
        <serialNumber>123-4567890</serialNumber>
        <UDN>1234:567</UDN>
        <UPC>JP100-1234</UPC>
        <serviceList>
            <service>
                <serviceType>urn:schemas-upnp-org:service:print:1</serviceType>
                <serviceId>urn:upnp-org:serviceId:print</serviceId>
                <SCPDURL>print.xml</SCPDURL>
                <controlURL>printcontrol.xml</controlURL>
            </service>
            <service>
                -- a second service can be described here --
            </service>
        </serviceList>
    </device>
</root>
```

Returning to FIG. 3, if the control point, as implemented by computing device 20, needed further information regarding one of the services advertised by the printer 116, it can issue the HTTP "get" command on the file specified by the "SCPDURL" sub-element within the "service" element. Thus, per the example in Table 1, the control point can issue a "get" command on the file "print.xml" to obtain further information regarding the print service, including information on arguments to be passed, variable to be used, and the data type, range, and event characteristics of each. Armed with this information, the control point can formulate an appropriate command, such as a request to print a specified page on a specified paper type, using a specified quality of printing, and can send the request to the page specified in the <controlURL> tag.

Figure 4:
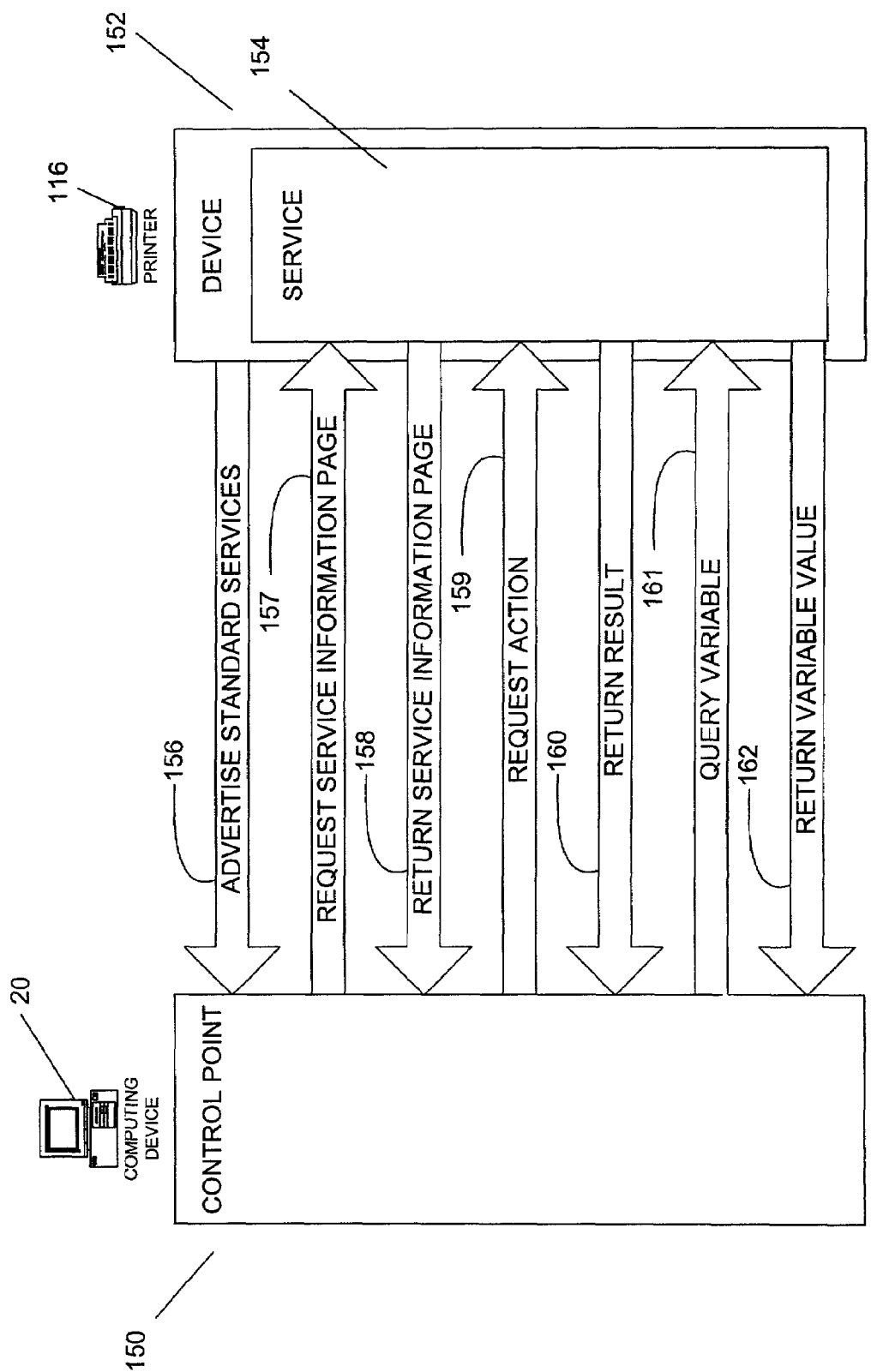
FIG. 4 is a block diagram generally illustrating a series of communications common in an architecture with which the present invention can be used.

FIG. 4 illustrates an exemplary set of communications between a control point 150, in the form of computing device 20, and a device 152, in the form of printer 116. Initially, as described above, the device 152 advertises its standard services in step 156 by sending an XML file such as the one shown in Table 1. If the control point 150 is interested in the services advertised, it can request a service information page at step 157, such as page "print.xml" identified in the device description page of Table 1. At step 158, the device 152 can respond by sending the requested page, which can contain further information regarding the service 154, as described above. The control point 150 can then request an action in step 159 by sending an HTTP "post" message to the page for the service 154, such as the page "printcontrol.xml" specified in Table 1, using the arguments and variables specified by the service information page returned at step 158. The device 152 will perform the action requested at step 159 and can change certain state variables as a result of the performance of the action. These state variables can then be communicated to the control point 150 in a response message 160, as indicators that the action was performed. Should the control point 150 require further information, it can query specific variables at step 161 in the same manner as requesting an action to be performed (e.g. with an HTTP "post" message), and the values of the requested variable can be returned by the service 154 at step 162.

As can be seen, the UPnP architecture allows devices and control points to establish communication with one another and allows control points to learn the functions offered by devices with no interaction on the part of the user. Returning to FIG. 3, the printer 116 need only have been plugged into the UPnP network 4 and the control point 150, implemented in computing device 20, would have been able to locate the printer 116 and use it.

In a similar manner, many types of devices can be connected to a UPnP network, such as network 4. For example, television sets, such as televisions 120, 128, and 134 can act as UPnP devices in a manner similar to printer 116. Similarly, electronic picture frames (EPFs) 124, 126, and 132, as well as stereos, such as stereo 122 or 130, can all act as UPnP devices. In a manner similar to printer 116, each of these devices will advertise their services by broadcasting an XML file, such as that shown in Table 1. Of course, the XML file of Table 1 references an XML schema for printers: "urn:schemas-upnp-org:device:printer:1". A different schema can be used for each of the other types of devices on network 4, shown in FIG. 3. For example, televisions 120, 128, and 134 can be described by an XML file referencing a television schema, such as "urn:schemas-upnp-org:device:television:1". Similarly, schemas "urn:schemas-upnp-org:device:epf:1" and "urn:schemas-upnp-org:device:stereo:1" can exist for creating XML files describing EPFs 124, 126, and 132 and stereos 122 and 130, respectively.

As is known by those of skill in the art, a schema defines a class of XML documents. Each of the tags, or elements, in an XML document can be defined in the schema the XML document has referenced. Elements can be simple, in that they contain merely numbers or characters, or they can be complex and contain sub-elements, some of which may have further sub-elements still. Table 2 below contains an exemplary XML schema defining a class of XML documents to which the exemplary device description document in Table 1 belongs. As can be seen from Table 2, elements are defined in terms of sub-elements, or of simple data types. Thus, the element "root" (identified by the <root> tag in Table 1 above) contains an element named "specVersion" and an element named "device." Referring back to Table 1, it can be seen that the root element contains only the two sub elements enumerated in the schema in Table 2: the "specVersion" element and the "device" element. Each of the elements "specVersion" and "device" is also defined in the schema. The element "specVersion" contains two sub-elements: "major" and "minor", each of which are further defined as being of type "int" or integers. Because the sub-elements "major" and "minor" are simple types, no further levels of definition are necessary, and the element "specVersion" is fully defined. The "device" element is similarly defined, having sub-elements, some of which, like "deviceType" and "manufacturer" are simple elements, and others, like "service" are complex and defined by still further sub-elements that are simple.

TABLE 2

```
<?xml version="1.0"?>
<Schema name="device-1-0"
    xmlns="urn:schemas-microsoft-com:xml-data"
    xmlns:dt="urn:schemas-microsoft-com:datatype">
<ElementType name="root" content="eltOnly">
    <element type="specVersion" />
    <element type="device" />
</ElementType>
<ElementType name="specVersion" content="eltOnly">
    <element type="major" />
    <element type="minor" />
</ElementType>
<ElementType name="major" dt:type="int" content="textOnly" />
<ElementType name="minor" dt:type="int" content="textOnly" />
<ElementType name="device" content="eltOnly">
    <element type="deviceType" />
    <element type="friendlyName" />
    <element type="manufacturer" />
    <element type="manufacturerURL" minOccurs="0" maxOccurs="1" />
    <element type="modelDescription" minOccurs="0" maxOccurs="1" />
    <element type="modelName"/>
    <element type="modelNumber" minOccurs="0" maxOccurs="1" />
    <element type="modelURL" minOccurs="0" maxOccurs="1" />
    <element type="serialNumber" minOccurs="0" maxOccurs="1" />
    <element type="UDN" />
    <element type="UPC" minOccurs="0" maxOccurs="1" />
    <element type="serviceList" />
</ElementType>
<ElementType name="deviceType" dt:type="uri" content="textOnly" />
<ElementType name="friendlyName" dt:type="string" content="textOnly" />
<ElementType name="manufacturer" dt:type="string" content="textOnly" />
<ElementType name="manufacturerURL" dt:type="uri" content="textOnly" />
<ElementType name="modelDescription" dt:type="string" content="textOnly" />
<ElementType name="modelName" dt:type="string" content="textOnly" />
<ElementType name="modelNumber" dt:type="string" content="textOnly" />
<ElementType name="modelURL" dt:type="uri" content="textOnly" />
<ElementType name="serialNumber" dt:type="string" content="textOnly" />
<ElementType name="UDN" dt:type="uri" content="textOnly" />
<ElementType name="UPC" dt:type="string" content="textOnly" />
<ElementType name="serviceList" content="eltOnly">
    <element type="service" minOccurs="1" maxOccurs="*" />
</ElementType>
<ElementType name="service" content="eltOnly">
    <element type="serviceType" />
    <element type="serviceId" />
    <element type="SCPDURL" />
    <element type="controlURL" />
    <element type="eventSubURL" />
</ElementType>
<ElementType name="serviceType" dt:type="uri" content="textOnly" />
<ElementType name="serviceId" dt:type="uri" content="textOnly" />
<ElementType name="SCPDURL" dt:type="uri" content="textOnly" />
<ElementType name="controlURL" dt:type="uri" content="textOnly" />
<ElementType name="eventSubURL" dt:type="uri" content="textOnly" />
</Schema>
```

Because a schema defines a class of documents, it is not required that every document within that class contain all of the elements defined in the schema. However, a document of the class defined by a schema may not contain elements that are not defined within the schema. Furthermore, the UPnP architecture implements the Flexible XML Processing Profile (FXPP), which specifies that devices and control points can ignore elements, and all sub-elements, which are not understood by the device. Thus, a more complex schema can be defined, allowing those devices and control points having appropriate capability access to additional features, while maintaining compatibility with older or less advanced devices and control points. The older or less advanced devices would simply advertise with an XML page that did not use all of the elements contained within the schema defined for that class. Similarly, older or less advanced control points would simply ignore those XML elements that they did not understand.

In accordance with one important aspect of the invention, an extended XML schema is provided for enabling devices and control points to allow a user of a device access to multiple categories of information, allowing the user to tune the information presented through the device. The XML schema for UPnP devices can define additional elements, as will be explained in more detail below, that can be used by devices and control points to define and present categories of information to a user. The additional elements, however, will not interfere with the normal operation of a UPnP network, as the additional elements within the device description document will be ignored by control points that do not contain the capabilities of the present invention. Because the information capable of being presented can come in various forms and formats, additional XML schemas are contemplated for various types of information presentation appliances.

In accordance with another important aspect of the invention, information presentation appliances which traditionally behaved as devices within the UPnP architecture can act as control points, allowing the information presentation appliance greater flexibility in presenting categories of information to a user and allowing the user to tune the information presented through the appliance acting as a control point. An information presentation appliance, such as an EPF, a stereo, or a printer, is generally a device under the UPnP architecture because it is controlled by a control point that feeds, or pushes, to the information presentation appliance, the information that the appliance is to present, including images, sound, or hard copy output. The present invention contemplates the information presentation appliance as a control point within the UPnP architecture, enabling it to request information from information storage appliances and servers, which, in turn, would be devices within the UPnP architecture. In this manner the information is pulled, or fetched, by the information presentation appliance, rather than being pushed to it.

In accordance with a further important aspect of the invention, an information presentation appliance within a UPnP network contains hardware and software for presenting categories of information to a user to allow the user to tune the appliance. A user interface is contemplated, implemented through various user input devices, which can enable a user to select among available categories of information to be presented to the user by each information presentation appliance.

In keeping with the invention, Table 3 illustrates an exemplary extended XML schema contemplated by the present invention. For clarity, the additional elements in Table 3, not found in Table 2, are shown in bold type. For example, the present invention contemplates an additional element, such as that named "informationCategoryList" in Table 3, which allows compliant devices to describe the types of information content they can present. As will be described further below, the user can be presented with a general listing of categories of information, such as styles of music, or genres of images, or categories of video clips, which the user can choose to be presented by the particular device. The user's selection can then be stored in the device and presented as part of the device information page using the schema of Table 3. The "informationCategoryList" element can contain sub-elements to further specify the user's selections. In such a manner, the exact title of the category of information selected by the user does not need to be matched, since additional information, such as keywords, can be used to more accurately present the user's selections.

TABLE 3

```
<?xml version="1.0"?>
<Schema names="device-1-0"
    xmlns="urn:schemas-microsoft-com:xml-data"
    xmlns:dt="urn:schemas-microsoft-com:datatypes">
<ElementType name="root" content="eltOnly">
    <element type="specVersion" />
    <element type="device" />
</ElementType>
<ElementType name="specVersion" content="eltOnly">
    <element type="major" />
    <element type="minor" />
</ElementType>
<ElementType name="major" dt:type="int" content="textOnly" />
<ElementType name="minor" dt:type="int" content="textOnly" />
<ElementType name="device" content="eltOnly">
    <element type="deviceType" />
    <element type="friendlyName" />
    <element type="manufacturer" />
    <element type="manufacturerURL" minOccurs="0" maxOccurs="1" />
    <element type="modelDescription" minOccurs="0" maxOccurs="1" />
    <element type="modelName" />
    <element type="modelNumber" minOccurs="0" maxOccurs="1"/>
    <element type="modelURL" minOccurs="0" maxOccurs="1" />
    <element type="serialNumber" minOccurs="0" maxOccurs="1" />
    <element type="UDN" />
    <element type="UPC" minOccurs="0" maxOccurs="1" />
    <element type="serviceList" />
    <element type="informationCategoryList" />
</ElementType>
<ElementType name="deviceType" dt:type="uri" content="textOnly" />
<ElementType name="friendlyName"dt:type="string" content= "textOnly" />
<ElementType name="manufacturer" dt:type="string" content="textOnly" />
```

TABLE 3-continued

```
<ElementType name="manufacturerURL" dt:type="uri" content="textOnly" />
<ElementType name="modelDescription" dt:type="string" content="textOnly" />
<ElementType name="modelName" dt:type="string" content="textOnly" />
<ElementType name="modelNumber" dt:type="string" content="textOnly" />
<EtementType name="modelURL" dt:type="uri" content="textOnly" />
<ElementType name="serialNumber" dt:type="string" content="textOnly" />
<ElementType name="UDN" dt:type="uri" content="textOnly" />
<ElementType name="UPC" dt:type="string" content="textOnly" />
<ElementType name="serviceList" content="eltOnly" />
    <element type="service" minOccurs="1" maxOccurs="*" />
</ElementType>
<ElementType name="service" convent="eltOnly">
    <element type="serviceType" />
    <element type="serviceId" />
    <element type="SCPDURL" />
    <element type="controlURL" />
    <element type="eventSubURL" />
</ElementlType>
<ElementType name="serviceType" dt:type="uri" content="textOnly" />
<ElementType name="serviceId" dt:type="uri" content="textOnly" />
<ElementType name="SCPDURL" dt:type=uri" content="textOnly" />
<ElementType name="controlURL" dt:type="uri" content="textOnly" />
<ElementType name="eventSubURL" dt:type="uri" content="textOnly"/>
<ElementType name="informationCategoryList" content="eltOnly" />
    <element type="informationCategory" minOccurs="1" maxOccurs="*" />
</ElementType>
<ElementType name="InformationCategory" content="eltOnly">
    <element type="InformationCategoryName" />
    <element type="InformationCategoryKeyworList" />
    <element type="InformationCategoryBlockedKeywordList" />
</ElementType>
<ElementType name="InformationCategoryName" dt:type="uri" content="textOnly" />
<ElementType name="inforrnationCategoryKeywordList" content="eltOnly">
    <element type="informationCategoryKeyword" minOccurs="0" maxOccurs="*" />
</ElementType>
<ElementType name="informationCategoryBlockedKeywordList" content="eltOnly">
    <element type="informationCategoryBlockedKeyword" minOccurs="0 " maxOccurs="*" />
<ElementType name=" InformationCategoryKeyword" dt:type="uri" content="textOnly" />
</ElementType name=" InformationCategoryBlockedKeyword" dt:type="uri" content="textOnly" />
</Schema>
```

As shown in Table 3, the "informationCategoryList" is an element that lists one or more "informationCategory" elements, allowing the user the opportunity to select multiple categories of information to be presented on the device. For each "informationCategory" element, sub-elements "InformationCategoryName", "InformationCategoryKeywordList" and "InformationCategoryBlockedKeywordList" allow the device to specify, respectively, within the device description page: a common name for the information category, keywords which can help identify the information category selected if there is no exact match to the information category name on the control point, and blocked keywords, which can be used to identify types of categories which are not to be presented by the device. To allow the user to list keywords, elements "InformationCategoryKeywordList" and "InformationCategoryBlockedKeywordList" are implemented as lists, having a single sub-element "InformationCategoryKeyword" and "InformationCategoryBlockedKeyword", respectively. The "InformationCategoryKeywordList" and "InformationCategoryBlockedKeywordList" elements can contain no elements, allowing the user not to specify keywords if they so choose.

Returning to FIG. 3, an EPF 124 is shown in the living room 106. The EPF 124 can present to the user an interface to allow the user to select the image or video clip categories to be presented on the EPF 124. As will be described further below, the user can be presented with a generic list of categories of images to be displayed, and an opportunity to enter keywords to further define the categories. Thus, for display in the living room, the user might select a "family" category and a "friends" category, and can enter further keywords, such as the names of the family members, or the locations that the family went on vacation to further define the category of images. The user can also be allowed to enter keywords of images the user does not wish to be displayed in the living room, such as advertisements, coupons, or delivery room pictures of the user's children. Once the user has made these selections, the EPF 124 can create a device description page such as the one show in Table 4, below.

Using an extended schema contemplated by the present invention, such as the one illustrated in Table 3 above, the device description in Table 4 can contain information regarding the types of images the user wishes to have displayed on the EPF 124 in the living room 106. For purposes of illustration, the elements of the device description in Table 4 which take advantage of the extended schema of Table 3, are shown in bold type. As can be seen, the element "informationCategoryList" provides a listing of the categories of images the EPF 124, acting as a device, is capable of displaying. The categories are each defined by the "informationCategory" elements, which, in the exemplary device description provided in Table 4, include the categories named "family", "friends", and "blocked." Each of these categories contains sub-elements which allow for key words. Thus, the "family" category contains a sub-element "informationCategoryKeywordList", which, in turn, contains further sub-elements storing key words to further describe the "family" category. In this manner, if the control point sending the images to the EPF 124 does not have a "family" category, it may still be able to identify certain pictures to be sent to the EPF based on the key words provided. Similarly, the "family" category also contains a sub-element "informationCategoryBlockedKeywordList" which contains keywords of images that should not be sent to the EPF. For example, the device description of Table 4 provides that images described by the keyword "delivery room" should not be send to the EPF 124 in the living room 106, even if such images are properly within the "family" image collection on the control point.

TABLE 4

```
<?xml version="1.0"?>
<root xmlns="urn:schemas-upnp-org:device-1-0">
    <specVersion>
        <major>1</major>
        <minor>0</minor>
    </specVersion>
    <device>
        <deviceType>urn:schemas-upnp-org:device:epf:1</deviceType>
        <friendlyName>Electronic Picture Frame</friendlyName>
        <manufacturer>EpfCo</manufacturer>
        <manufacturerURL>http://www.epfco.com</manufacturerURL>
        <modelDescription>LCD Picture Frame</modelDescription>
        <modelName>DigiFrame</modelName>
        <modelNumber>2</modelNumber>
        <modelURL>http://www.epfco.com/digiframe2.html</modelURL>
        <serialNumber>987-653210</serialNumber>
        <UDN>9876:543</UDN>
        <UPC>DF2-9876</UPC>
        <serviceList>
            <service>
                <serviceType>urn:schemas-upnp-org:service:epf:1</serviceType>
                <serviceId>urn:upnp-org:serviceId:epf</serviceId>
                <SCPDURL>display.xml</SCPDURL>
                <controlURL>displaycontrol.xml</controlURL>
            </service>
            <service>
                --a second service can be described here --
            </service>
        </serviceList>
        <informationCategoryList>
            <informationCategory>
                <informationCategoryName>family</informationCategoryName>
                <informationCategoryKeywordList>
                    <informationCategoryKeyword>Mom</informationCategoryKeyword>
                    <informationCategoryKeyword>Dad</informationCategoryKeyword>
                    <informationCategoryKeyword>Mike</informationCategoryKeyword>
                    <informationCategoryKeyword>Amy</informationCategoryKeyword>
                </informationCategoryKeywordList>
                <informationCategoryBlockedKeywordList>
                    <informationCategoryBlockedKeyword>Delivery Room
                    </informationCategoryBlockedKeyword>
                </informationCategoryBlockedKeywordList>
            </informationCategory>
            </informationCategory>
                <informationCategoryName>friends </informationCategoryName>
                <informationCategoryKeywordList>
                    <informationCategoryKeyword>Sarah</informationCategoryKeyword>
                    <informationCategoryKeyword>Julie</informationCategoryKeyword>
                    <informationCategoryKeyword>Doug</informationCategoryKeyword>
                    <informationCategoryKeyword>Sue</informationCategoryKeyword>
                </informationCategoryKeywordList>
            </informationCategory>
                <informationCategoryName>blocked </informationCategoryName>
                <informationCategoryBlockedKeywordList>
                    <informationCategoryBlockedKeyword>Coupon
                    </informationCategoryBlockedKeyWord>
                    <informationCategoryBlockedKeyword>Advertisement
                    </informationCategoryBlockedKeyword>
                </informationCategoryBlockedKeywordList>
            </informationCategory>
        </informationCategoyList>
    </device>
</root>
```

The present invention contemplates that the information categories can be used, not only to enumerate those categories which the user wishes to have displayed on the device, but also to enumerate those categories which should not be sent to the device. The illustrative device description document shown in Table 4 contains an information category named "blocked" that contains no keywords, but does contain blocked keywords. Images matching the blocked keywords will not be displayed on the device even if they otherwise meet a selected category. Because, as shown in Table 3, the schema does not require a single entry in the "informationCategoryKeywordList", it is possible that an information category exists which contains no keywords. Similarly, because the schema of Table 3 does not require a single entry in the "informationCategoryBlockedKeywordList", it is possible that an information category exists which contains no blocked keywords, such as the category "friends" shown in Table 4.

Figure 5:
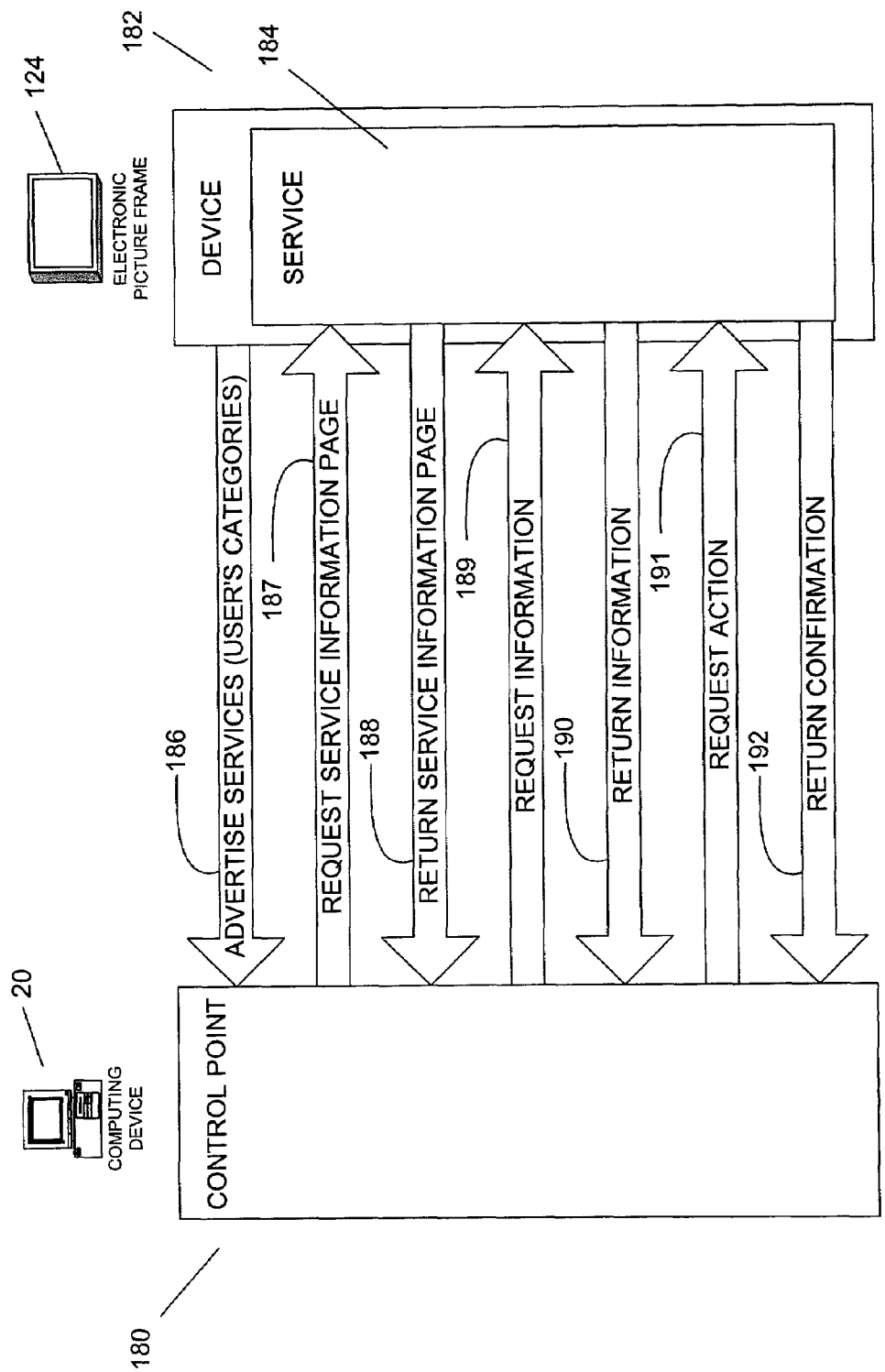
FIG. 5 is a block diagram generally illustrating a series of communications contemplated by the present invention.

Turning to FIG. 5, an exemplary set of communications is shown using the schema extensions contemplated by the present invention. The control point 180 can be the computing device 20. The computing device 20 can contain the images to be displayed in an image store 43, which can be located on a local storage medium, such as hard disk 60, or downloaded from a remote computing device, such as through the Internet 50. The images may be categorized into different folders or databases, or they may have keywords associated with them, such as can be done with a digital photo album. The EPF 124, acting as device 182, can broadcast, at step 186, its device description containing, in a manner similar to that described in Table 4, the user's preferences regarding the nature of the images to be displayed. Upon receipt of the device description page, the control point 180 can compare the categories and keywords listed by the device 182 with the images contained within the image store 43 to determine whether it is appropriate to request the device to display any images.

If the control point 180 cannot identify any images within the image store 43 that correspond to the categories or keywords provided in the device description received at step 186, then the control point 180 will not perform a request for additional services at step 189 and there will be no further communication between the control point and the device 182. However, if the control point 180 can identify images within the image store 43 that match the categories or keywords provided in the device description, it can request a service information page at step 187 to determine how to display the identified images on the device 182. As shown in FIG. 5, the device 182 contains at least one service 184, whose functionality is described in a service description page. The device description page of Table 4 enumerates a service information page called "displaycontrol.xml", which can be requested at step 187. In response to this request, the device can return the "displaycontrol.xml" service information page at step 188. An exemplary "displaycontrol.xml" service information page is shown in Table 5 below. As can be seen, the exemplary service information page of Table 5 defines two actions: "GetDisplayInfo" and "PutImage". As will be explained further below, a control point can use a URL, by issuing an HTTP "get" command, to obtain information from a device or request that a device perform an action. Thus, as shown in FIG. 5, at step 189, the computing device 20 can use the "GetDisplayInfo" action to request information from the EPF 124. At step 190, the EPF 124 can return the information requested. The "GetDisplayInfo" action defined in Table 5, below, contains a number of defined variables, including: the width of the display of the EPF 124, the height of the display of the EPF, and the color depth display capabilities of the EPF. Given this information, the computing device 20 can scale an appropriate image to fit the display capabilities of the EPF 124, and can request the EPF 124 to display the image at step 191. A confirmation can then be returned at step 192, if necessary.

TABLE 5

```
<?xml version="1.0"?>
<scpd xmlns="urn:schemas-upnp-org:service-1-0">
    <specVersion>
        <major>1 </major>
        <minor>0</minor>
    </specVersion>
    <serviceStateTable>
        <stateVariable sendEvents="yes">
            <name>CurrentImageURL</name>
            <dataType>uri</dataType>
        </stateVariable>
        <stateVariable sendEvents="yes">
            <name>ImageTitle</name>
            <dataType>string</dataType>
        </stateVariable>
        <stateVariable sendEvents="yes">
            <name>ImageAuthor</name>
            <dataType>string</dataType>
        </stateVariable>
        <stateVariable sendEvents="yes">
            <name>ImageSubject</name>
            <dataType>string</dataType>
        </stateVariable>
        <stateVariable sendEvents="yes">
            <name>ImageDateTimeTaken</name>
            <dataType>string</dataType>
        </stateVariable>
        <stateVariable sendEvents="no">
            <name>ImageGpsLatitude</name>
            <dataType>string</dataType>
        </stateVariable>
        <stateVariable sendEvents="no">
            <name>ImageGpsLongitude</name>
            <dataType>string</dataType>
        </stateVariable>
        <stateVariable sendEvents="no">
            <name>ImageActualWidth</name>
            <dataType>ui4</dataType>
```

TABLE 5-continued

```
        </stateVariable>
        <stateVariable sendEvents="no">
            <name>ImageActualHeight</name>
            <dataType>ui4</dataType>
        </stateVariable>
        <stateVariable sendEvents="no">
            <name>ImageActualColorDepth</name>
            <dataType>ui4</dataType
        </stateVariable>
            <stateVariable sendEvents="no">
            <name>DisplayWidth</name>
            <dataType>ui4</dataType>
        </stateVariable>
        <stateVariable sendEvents="no">
            <name>DisplayHeight</name>
            <dataType>ui4</dataType>
        </stateVariable>
        <stateVariable sendEvents="no">
            <name>DisplayColorDepth</name>
            <dataType>ui4</dataType>
        </stateVariable>
</serviceStateTable>
<actionList>
    <action>
        <name>GetDisplayInfo</name>
            <argumentList>
                <argument>
                    <name>Width</name>
                    <relatedStateVariable>DisplayWidth</relatedStateVariable>
                    <direction>out</direction>
                </argument>
                <argument>
                    <name>Height</name>
                    <relatedStateVariable>DisplayHeight</relatedStateVariable>
                    <direction>out</direction>
                </argument
                <argument>
                    <name>ColorDepth</name>
                    <relatedStateVariable>DisplayColorDepth</relatedStateVariable>
                    <direction>out</direction>
                </argument>
            </argumentList>
    </action>
    <action>
        <name>PutImage</name>
        <argumentList>
            <argument>
                <name>ImageURL</name>
                <relatedStateVariable>CurrentImageURL</relatedStateVariable>
                <direction>in</direction>
            </argument>
            <argument>
                <name>ImageTitle</name>
                <relatedStateVariable>ImageTitle</relatedStateVariable>
                <direction>in</direction>
            </argument>
            <argument>
                <name>ImageAuthor</name>
                <relatedStateVariable>ImageAuthor</relatedStateVariable>
                <direction>in</direction>
            </argument>
            <argument>
                <name>ImageSubject</name>
                <relatedStateVariable>ImageSubject</relatedStateVariable>
                <direction>in</direction>
            </argument>
            <argument>
                <name>ImageDateTimeTake</name>
                <relatedStateVariable>ImageDateTimeTaken</relatedStateVariable>
                <direction>in</direction>
            </argument>
            <argument>
                <name>ImageGpsLatitude</name>
                <relatedStateVariable>ImageGpsLatitude</relatedStateVariable>
                <direction>in</direction>
            </argument>
            <argument>
                <name>ImageGpsLongitude</name>
                <relatedStateVariable>ImageGpsLongitude</relatedStateVariable>
```

TABLE 5-continued

```
                <direction>in</direction>
            </argument>
            <argument>
                <name>ImageActualWidth</name>
                <relatedStateVariable>ImageActualWidth</relatedStateVariable>
                <direction>in</direction>
            </argument>
            <argument>
                <name>ImageActualHeight</name>
                <relatedStateVariable>ImageActualHeight<relatedStateVariable>
                <direction>in</direction>
            </argument>
            <argument>
                <name>ImageActualColorDepth</name>
                <relatedStateVariable>ImageActualColorDepth</relatedStateVariable>
                <direction>in</direction>
            </argument>
        </argumentList>
    </action>
  </actionList>
</scpd>
```

The "PutImage" action defined in the exemplary service description page of Table 5 above, contains both the location of the image and arguments for passing image "metadata"—data about the image. The "ImageURL" variable can contain the location of the scaled image, which the EPF 124 is to display. The arguments, however, can contain further information, which the user can select the EPF 124 to display together with the image. For example "ImageTitle", "ImageAuthor", and "ImageSubject" can contain information about the title, author, and subject of the image taken, and can be edited by the user. Additional variables can contain data imprinted by a digital camera. For example, "ImageDateTimeTake", "ImageGPSLatitude", "ImageGPSLongitude", "ImageActualWidth", "ImageActualHeight", and "ImageAcutalColorDepth" can contain a date/time stamp, a location stamp, and image data as recorded by the digital camera or other digital image capture device.

As an alternative to the modifications to the schema of a UPnP device disclosed above, the present invention also contemplates an information presentation appliance, which traditionally would act as a device under the UPnP architecture, acting as a control point. For example, EPF 124 can become a UPnP control point on the UPnP network 4. With the information presentation appliance, such as EPF 124, as the control point, an image store, such as image store 43 in computing device 20 would become a device. The control point would search the UPnP network 4 for devices which contained information, or would wait for devices to advertise themselves, and would request that the device send the information to the control point to be presented to the user. As can be seen, by using an information presentation appliance as a UPnP control point, the presentation of information is changed from a "push" model, in which the information store pushes information to an information presentation appliance, into a "pull" model in which the appliance finds appropriate information stores and pulls the information from those stores that have the information it seeks.

Table 6 below contains an exemplary device description such as might be used by the computing device 20 to advertise its collection of images 43. As will be obvious to those skilled in the art, an analogous device description can be used for the collection of audio files 44, or any other information that can be presented to the user. As will also be known by those skilled in the art, a complex appliance, such as computing device 20 can act as more than one UPnP device. Thus, the computing device 20 can simultaneously act as a picture server device, serving images from the image store 43 and a audio server device, serving streaming audio from the audio store 44.

TABLE 6

```
<?xml version="1.0"?>
<root xmlns="urn:schemas-upnp-org:device-1-0">
    <specVersion>
        <major>1</major>
        <minor>0</minor>
    </specVersion>
    <device>
        <deviceType>urn:schemas-upnp-org:device:PictureSharer:1</deviceType>
        <friendlyName>%s Picture Sharer</friendlyName>
        <manufacturer>Microsoft</manufacturer>
        <manufacturerURL>http://www.microsoft.com</manufacturerURL>
        <modelDescription>Microsoft .Net Picture Sharer</modelDescription>
        <modelName>Microsoft .Net Picture Sharer </modelName>
        <modelNumber>1.0</modelNumber>
        <modelURL>http://www.printerco.com/modelURL</modelURL>
        <serialNumber>1</serialNumber>
        <UDN>UdnFilledInByDeviceHostAPI</UDN>
        <UPC>1</UPC>
        <serviceList>
```

TABLE 6-continued

```
        <service>
            <serviceType>urn:schemas-upnp-org:service:PictureStoreAccess:1</serviceType>
            <serviceId>>urn:upnp-org:serviceId:PictureStoreAccess</serviceId>
            <SCPDURL>PicutreSharerService.xml</SCPDURL>
            <controlURL></controlURL>
            <eventSubURL></eventSubURL>
        </service>
        <service>
            -- a second service can be described here --
        </service>
        </serviceList>
    </device>
</root>
```

As can be seen from Table 6, the "Picture Sharer" device exposed by the computing device 20 does not need to use the exemplary extended schema of Table 3, and can use a standard UPnP device schema, such as that shown in Table 2. The "Picture Sharer" device of the description illustrated in the Table 6 above exposes a service "PictureStoreAccess" which allows a control point to request specific categories of images to be displayed. Table 7, below, contains an exemplary service description page of the "PictureStoreAccess" service. The exemplary service description page of Table 7 allows the control point, implemented as the EPF 124, to request the categories of pictures, or "albums", available on the "Picture Sharer" device and to request information about each of the albums, including a name of the album, a preview of the album, a default play direction for the images in the album, a default play mode for the album, the number of pictures in the album, and a URL for accessing a picture in the album.

As can be seen, the exemplary service description page of Table 7 provides for four actions which can be invoked by the control point: "GetNumberOfAlbums", "GetAlbumIdList", "GetAlbumInfo", and "GetPictureInfo". The "GetNumberOfAlbums" action can contain a single argument, "NumAlbums", which is returned by the "Picture Sharer" device and contains the number of image albums the device can send to the EPF 124. If "NumAlbums" is equal to zero, then the EPF 124 can indicate to the user that there are no published albums on the "Picture Sharer" device. The "GetAlbumIdList" action likewise can contain a single argument, "AlbumIdList", which is returned by the "Picture Sharer" device and contains a comma delimited list of identifiers of image albums the device can send to the EPF 124. The "GetAlbumInfo" action can contain a number of arguments for passing information from the "Picture Sharer" device. The "AlbumId" argument can be sent as part of the "GetAlbumInfo" action to the "Picture Sharer" device to identify the album from which the picture can be retrieved. The "GetAlbumInfo" action can then return the arguments: "FriendlyName", which can be a name given to the album by the user or the album's creator, "NumPictures", which can contain the number of images in the album, "BasePictureURL", which is a URL that can be used by the control point to request an image through an HTTP "get" command, "BaseFileURL", which is a URL that can be used by the control point to request an non-image file through an HTTP "get" command, "PreviewURL", which is a URL that can be used by the control point to request a preview of the images in a specified album, "PlayDirection", which can contain the direction of the display of the images through the album, "PlayMode", which can contain the mode in which the images are displayed, and "DisplayTimeSeconds", which can contain the number of seconds to display each received image. The "GetPictureInfo" action can also contain a number of arguments for passing information from the "Picture Sharer" device. As with "GetAlbumInfo", "GetPictureInfo" provides arguments for identifying the picture about which further information is required, namely: "AlbumID" and "PictureNumber", which can be passed to the "Picture Sharer" device and can contain, respectively, an identification of the album in which the picture is located, and the number of the picture within that album. The "Picture Sharer" device can then return the following arguments: "ActualPictureWidth", "ActualPictureHeight", "ActualPictureColorDepth", "PicutreFileName", "PictureTakenTime", "PictureTitle", "PictureAuthor", "PictureSubject", and "DisplayTimeSeconds", which can contain, respectively, the width of the image, the height of the image, the color depth of the image, user given name of the image file, the date imprinted on the image, such as by a digital camera, the title given to the picture, the person who took the picture, the subject of the picture, and the length for which the picture should be displayed. The "GetPictureInfo" action also provides an argument "PictureURL", which can contain the full URL for the picture file on the "Picture Sharer" device.

TABLE 7

```
<?xml version="1.0"?>
<scpd xmlns="urn:schemas-upnp-org:service-1-0">
    <specVersion>
        <major>1</major>
        <minor>0</minor>
    </specVersion>
    <serviceStateTable>
        <stateVariable sendEvents="yes">
            <name>NumAlbums</name>
            <dataType>i4</dataType>
        </stateVariable>
        <stateVariable sendEvents="yes">
            <name>AlbumIdList</name>
            <dataType>string</dataType>
        </stateVariable>
        <stateVariable sendEvents="yes">
            <name>LastChangedAlbum</name>
            <dataType>string</dataType>
        </stateVariable>
        <stateVariable sendEvents="no">
            <name>A ARG TYPE String</name>
            <dataType>string</dataType>
        </stateVariable>
        <stateVariable sendEvents="no">
            <name>A ARG TYPE URI</name>
            <dataType>uri</dataType>
        </stateVariable>
        <stateVariable sendEvents="no">
            <name>A ARG TYPE Int</name>
```

TABLE 7-continued

```
            <dataType>i4</dataType>
        </stateVariable>
        <stateVariable sendEvents="no">
            <name>A ARG TYPE PlayDirection</name>
            <dataType>string</dataType>
            <allowedValueList>
                <allowedValue>FORWARD</allowedValue>
                <allowedValue>BACKWARD</allowedValue>
                <allowedValue>SHUFFLE</allowedValue>
            </allowedValueList>
                    <defaultValue>FORWARD</defaultValue>
        </stateVariable>
        <stateVariable sendEvents="no">
            <name>A ARG TYPE PlayMode</name>
            <dataType>string</dataType>
            <allowedValueList>
                <allowedValue>ONCE</allowedValue>
                <allowedValue>REPEAT</allowedValue>
            </allowedValueList>
                    <defaultValue>REPEAT</defaultValue>
        <stateVariable>
</serviceStateTable>
<actionList>
    <action>
        <name>GetNumberOfAlbums</name>
        <argumentList>
            <argument>
                <name>NumAlbums</name>
                <relatedStateVariable>
                    NumAlbums
                </relatedStateVariable>
                <direction>out</direction>
            </argument>
        </argumentList>
    </action>
    <action>
        <name>GetAlbumIdList</name>
        <argumentList>
            <argument>
                <name>AlbumIdList</name>
                <relatedStateVariable>
                    A ARG TYPE String
                </relatedStateVariable>
                <direction>out</direction>
            </argument>
        </argumentList>
    </action>
    <action>
        <name>GetAlbumInfo</name>
        <argumentList>
            <argument>
                <name>AlbumId/name>
                <relatedStateVariable>
                    A ARG TYPE String
                </relatedStateVariable>
                <direction>in</direction>
            </argument>
            <argument>
                <name>FriendlyAlbumName</name>
                <relatedStateVariable>
                    A ARG TYPE String
                </relatedStateVariable>
                <direction>out</direction>
            </argument>
            <argument>
                <name>NumPicture</name>
                <relatedStateVariable>
                    A ARG TYPE Int
                </relatedStateVariable>
                <direction>out</direction>
            </argument>
            <argument>
                <name>BasePictureURL</name>
                <relatedStateVariable>
                    A ARG TYPE URI
                </relatedStateVariable>
                <direction>out</direction>
            </argument>
            <argument>
                <name>BaseFileURL</name>
                <relatedStateVariable>
                    A ARG TYPE URI
                </relatedStateVariable>
                <direction>out</direction>
            </argument>
            <argument>
                <name>PreviewURL</name>
                <relatedStateVariable>
                    A ARG TYPE URI
                </relatedStateVariable>
                <direction>out</direction>
            </argument>
            <argument>
                <name>PlayDirection</name>
                <relatedStateVariable>
                    A ARG TYPE PlayDirection
                </relatedStateVariable>
                <direction>out</direction>
            </argument>
            <argument>
                <name>PlayMode</name>
                <relatedStateVariable>
                    A ARG TYPE PlayMode
                </relatedStateVariable>
                <direction>out</direction>
            </argument>
            <argument>
                <name>DisplayTimeSeconds</name>
                <relatedStateVariable>
                    A ARG TYPE Int
                </relatedStateVariable>
                <direction>out</direction>
            </argument>
        </argumentList>
    </action>
    <action>
        <name>GetPictureInfo<name>
        <argumentList>
            <argument>
                <name>AlbumId</name>
                <relatedStateVariable>
                    A ARG TYPE String
                </relatedStateVariable>
                <direction>in</direction>
            </argument>
            <argument>
                <name>PictureNumber</name>
                <relatedStateVariable>
                    A ARG TYPE int
                </relatedStateVariable>
                <direction>in</direction>
            </argument>
            <argument>
                <name>ActualPictureWidth</name>
                <relatedStateVariable>
                    A ARG TYPE Int
                </relatedStateVariable>
                <direction>out</direction>
            </argument>
            <argument>
                <name>ActualPictureHeight</name>
                <relatedStateVariable>
                    A ARG TYPE Int
                </relatedStateVariable>
                <direction>out</direction>
            </argument>
            <argument>
                <name>ActualPictureColorDepth</name>
                <relatedStateVariable>
                    A ARG TYPE int
                </relatedStateVariable>
                <direction>out</direction>
            </argument>
            <argument>
                <name>PictureFileName</name>
                <relatedStateVariable>
                    A ARG TYPE String
                </relatedStateVariable>
```

TABLE 7-continued

```
                <direction>out</direction>
            </argument>
            <argument>
                <name>PictureTakenTime</name>
                <relatedStateVariable>
                    A_ARG_TYPE_String
                </relatedStateVariable>
                <direction>out</direction>
            </argument>
            <argument>
                <name>PictureTitle</name>
                <relatedStateVariable>
                    A_ARG_TYPE_String
                </relatedStateVariable>
                <direction>out</direction>
            </argument>
            <argument>
                <name>PictureAuthor</name>
                <relatedStateVariable>
                    A_ARG_TYPE_String
                </relatedStateVariable>
                <direction>out</direction>
            </argument>
            <argument>
                <name>PictureSubject</name>
                <relatedStateVariable>
                    A_ARG_TYPE_String
                </relatedStateVariable>
                <direction>out</direction>
            </argument>
            <argument>
                <name>PictureURL</name>
                <relatedStateVariable>
                    A_ARG_TYPE_URI
                </relatedStateVariable>
                <direction>out</direction>
            </argument>
        </argumentList>
    </action>
</actionList>
</scpd>
```

As is known by those of skill in the art, a control point can use a URL to request specific information from a device. The URL is constructed to reflect the information sought and it is sent to the device using an HTTP "get" command. Thus, a URL can be constructed by the control point implemented in EPF 124 to request a picture, based on the "BasePictureURL" argument, of the form: http://host:port/localInfo, where the host is the machine name of computing device 20 and the port is the port on computing device 20 through which UPnP communications are being exchanged. LocalInfo can be of the form: ssisapi.dll?AlbumId=_&PictureNum=_&Width=_& qjHeight=_&ColorDepth=_&ScaleSmallImages=_where the "AlbumId" is the identifier of the album, the "PictureNum" is the number of the picture requested within the album, the "Width", "Height", and "ColorDepth" are the maximum width, height, and pixel depth abilities of the display device, such as EPF 124, and "ScaleSmallImages" is a binary value which can allow images smaller than the requested width and height to be scaled appropriately.

The exemplary service description page of Table 7 also contains state variables, including: "A_ARG_TYPE_String", "A_ARG_TYPE_URI" and "A_ARG_TYPE_Int", which are of type String, Uri, and Int (or Integer), respectively. Some state variables can be evented so that a change in that variable can be automatically communicated by the device to any control point that has subscribed to the eventing service, without the need for the control point to specifically request the value of the state variable. The exemplary service description of Table 7 provides for three state variables that can be evented: "NumAlbums", which can indicate the number of albums available on the "Picture Sharer" device at a current time, "AlbumIdList", which can be a comma delimited list of all of the album IDs published by the "Picture Sharer" device at a current time, and "LastChangedAlbum", which can indicate the last album that was modified.

Figure 6:
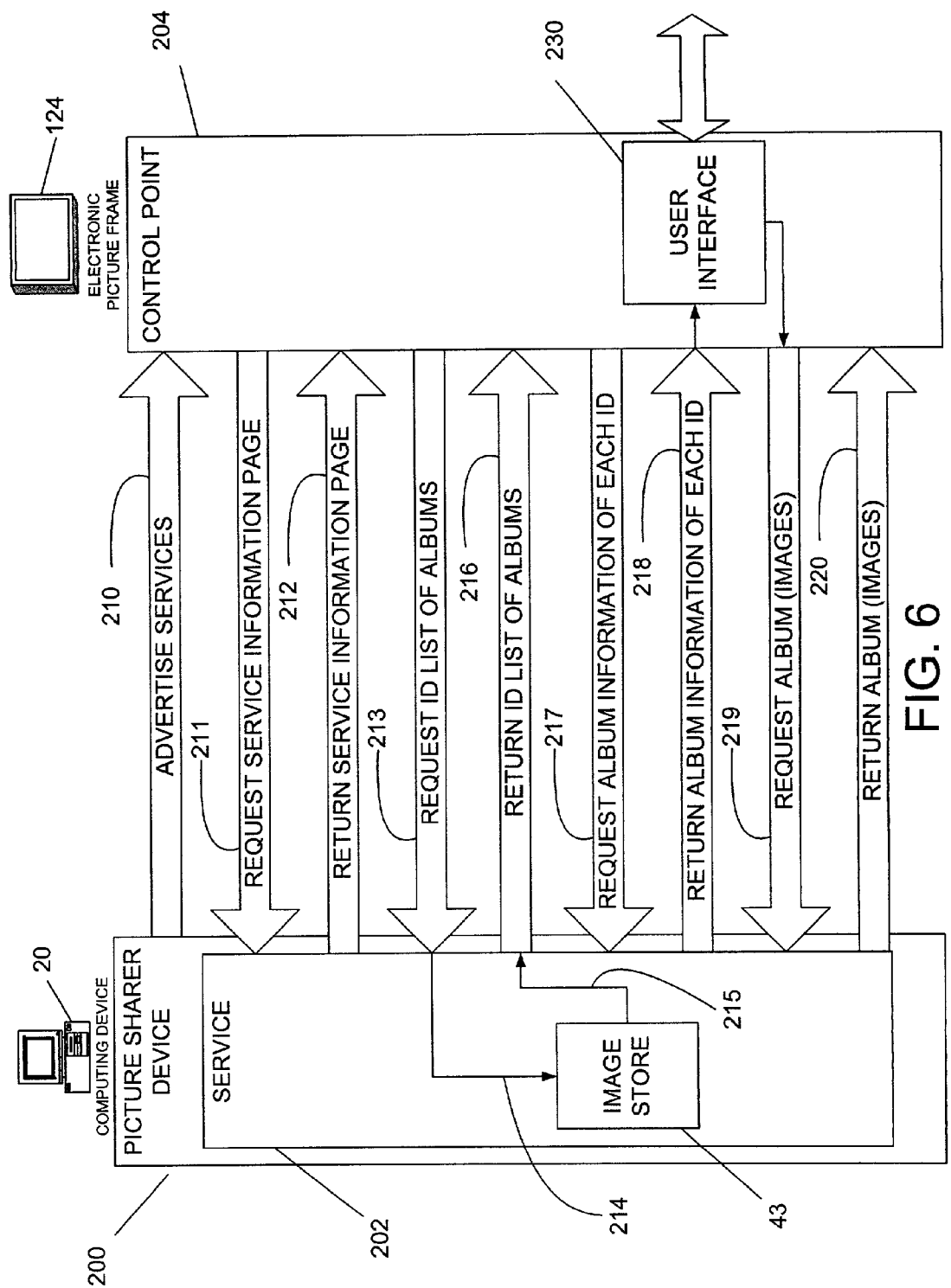
FIG. 6 is a block diagram generally illustrating a series of alternate communications contemplated by the present invention.

Turning to FIG. 6, an exemplary series of communications are shown between the EPF 124, implemented as a control point 204, and the computing device 20, hosting the Picture Sharer as a device 200. The PictureSharerService is shown as a service 202 in FIG. 6. Initially, the device 200 can advertise its services at step 210 by sending a device description page, such as the one shown in Table 7. The control point 204 can then, at step 211, request the service information page, such as the exemplary PictureSharerService page shown in Table 7, which will be returned to it in step 212. As explained above, the PictureSharerService exposes a function "GetAlbumIdList", which the control point 204 can call at step 213 to obtain a list of available albums from the Picture Sharer device 200, which can be returned at step 216. To more effectively present the list of albums available to the user, the control point 204 can, at step 217, perform a "GetAlbumInfo" request on each album ID contained within the returned list. In this manner, the control point 204 can learn the names of each of the albums and present the user with their names, rather than their numeric identifiers, which can be meaningless to the user. When the device 200 returns the information of each album at step 218, a user interface 230 at the control point 204 can be created and presented to the user to allow the user to select which albums of images are to be displayed on the EPF 124. Once the user has elected the albums to be displayed, the control point 204 can request those albums at step 219, such as with an HTTP "get" command to the "BasePictureURL" as described above, and the device can return the images, at step 220, in the requested format, to the EPF 124 for display.

Figure 7:
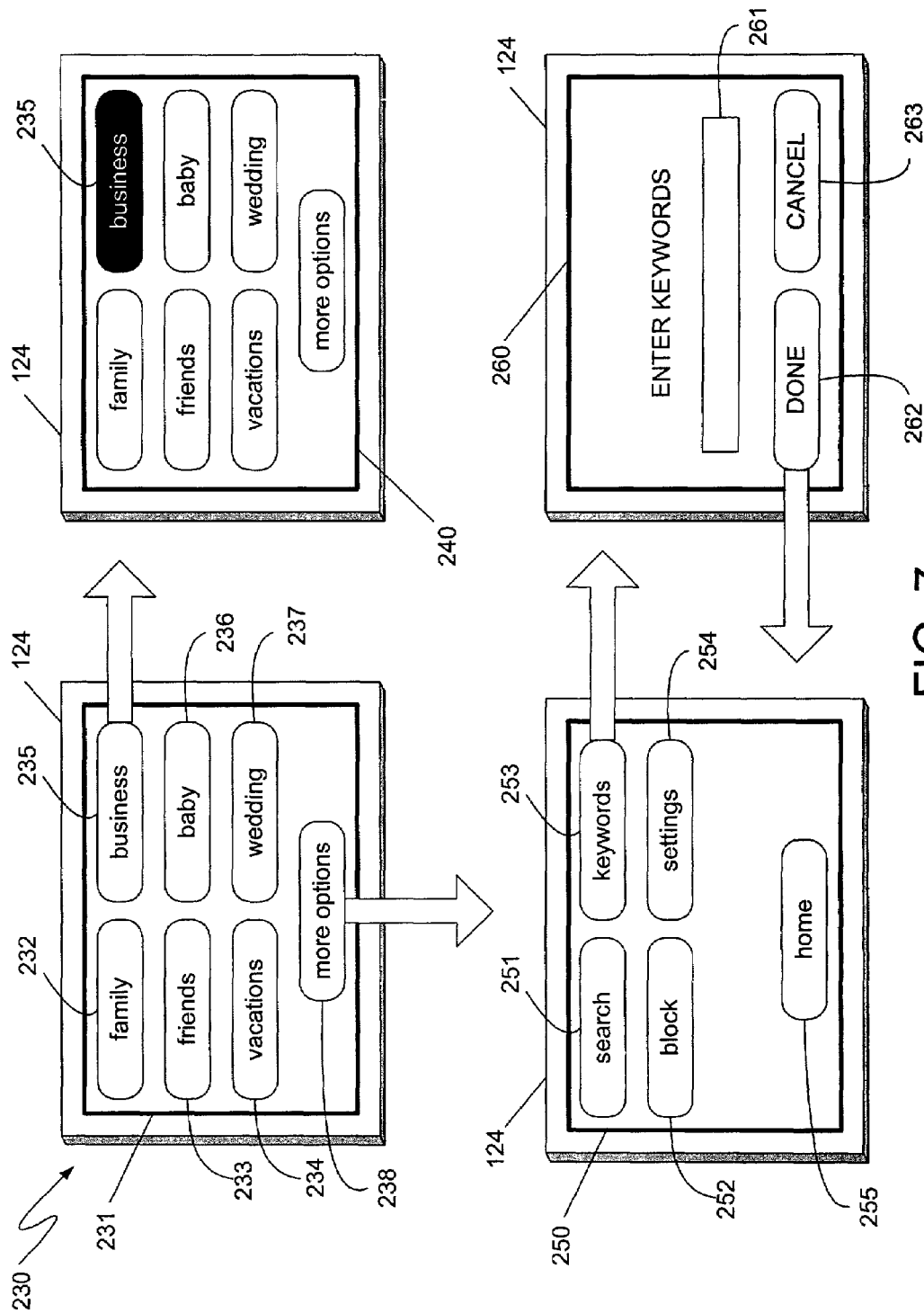
FIG. 7 is a user interface diagram generally illustrating an exemplary user interface contemplated by the present invention.

The present invention further contemplates a user interface, such as the user interface 230 of FIG. 6, that allows a user to select the categories of information to be presented to the user from any given information presentation appliance. FIG. 7 illustrates an exemplary user interface 230 contemplated by the present invention. On an initial screen 231, the user can be presented with the names of any information categories that the information presentation appliance can present to the user. For purposes of illustration, FIG. 7 shows an exemplary user interface of the EPF 124. The initial screen 231 contains categories of images or video clips that are available for display on the EPF 124, including a "family" category represented by button 232, a "friends" category represented by button 233, a "vacations" category represented by button 234, a "business" category represented by button 235, a "baby" category represented by button 236, and a "wedding" category represented by button 237. An additional button 238 allows the user access to additional options. The categories provided on the initial screen 231 could have been derived from a Picture Sharer device, as described in detail above, or they can be generic categories which, once selected by the user, can be incorporated into the device description page of the EPF 124 using an extended schema contemplated by the present invention, as was described in detail earlier.

To facilitate multiple selection, the selection of a single category, such as category 235, can present a new screen 240 with the selected category highlighted. Once the user has completed all of their selections, the device can obtain the appropriate images or video clips. Alternatively, the user can select the "more options" button 238 and can be presented with a screen such as screen 250, containing additional options, including a "search" button 251, a "block" button 252, a "keywords" button 253, and a "settings" button 254. Also, a "home" button 255 is provided to allow the user to return to the previous screen. The exemplary functionality described in detail earlier, such as allowing the user to define images through keywords, or use keywords to block specific types of images from being delivered to the EPF 124 can be accessed through a screen such as screen 250. The selection of one of the options, such as "keywords" button 253 can cause the display of a user entry screen, such as screen 260, containing an input box 261 in addition to buttons 262 and 263, allowing the user to enter their input or cancel their input, respectively. The selection of either button 262 or 263 will allow the user to return to the previous screen 250. The user's interaction with the EPF 124 can be through any number of hardware and software devices, including a mouse 17, or a keyboard 18, as shown in FIG. 1, or though a touch-screen, a jog-dial, or similar device, which are not shown.

Returning to FIG. 3, each of the information appliances shown, including stereos 122 and 130, EPFs 124, 126, and 132, and televisions 120, 128, and 134 can operate in a similar manner to that described above. The present invention is not intended to be limited to image presentation appliances, such as EPF 124. Rather, it is intended to be used with any appliance capable of presenting information to the user. For example, a stereo, such as stereos 122 and 130 can present aural information to a user by playing sound files obtained from the computing device 20 such as from the audio store 44 on hard disk 60, or through the broadband Internet connection 112, including downloaded files and streaming audio files, such as through Internet radio stations. As described above, the stereos 122 or 130 can act as either a UPnP device or a control point. If the stereos 122 or 130 act as a UPnP device, then, using an extended schema contemplated by the present invention, such as the extended schema shown in Table 3, the stereos 122 or 130 can allow a user to input different categories or keywords of songs the user wishes to be played through stereos 122 or 130. The stereos 122 or 130 can then create an appropriate device description document, using the extended schema, to communicate the user's selections to control points on the UPnP network 4. The computing device 20, acting as a control point, can then obtain control over stereos 122 or 130 and send sound data to them if the control point contains, in local storage 44, or though a WAN, such as the Internet 50, the categories of songs that the user has selected. Alternatively, if the stereos 122 or 130 act as a UPnP control point, then they can search for devices on the UPnP network 4 that can serve audio information, such as a "Song Sharer" application operating on the computing device 20. The stereos 122 or 130 can then request the service description page of the "Song Sharer" application, and can further determine, as described in detail above, the categories of songs that can then be presented to the user. Based on the user's selections, the stereos 122 or 130 can then, through appropriate functions calls and appropriately constructed HTTP "get" commands, request that the "Song Sharer" application deliver the audio data to the stereos for playback.

As can be seen, the present invention provides for a method, system, and apparatus for allowing a user to tune the categories of information presented to the user through individual information presentation appliances. In addition to the embodiments described above, the present invention can be used for many various applications. For example, an EPF 126 in a kitchen 104 can be tuned to present only coupons, allowing the user to send such information to the location where it most likely to be used. If a coupon is displayed that matches an item on the user's shopping list, the user can request that the EPF 126 print the coupon on printer 116. Additionally, the user can tune a television 128 in the kid's bedroom 110 to prevent the television from displaying R-rated movies, or any adult content. The present invention contemplates the use of standard UPnP devices and XML schemas for those devices as the basis upon which the extensions described above can be added to enable the functionality contemplated by the present invention.

All of the references cited herein, including patents, patent applications, and publications, are hereby incorporated in their entireties by reference.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

We claim:

1. A method of tuning comprising:

facilitating in an inter-appliance communication network configuring at least one of a plurality of information presentation appliances which were defined as Universal Plug and Play (UPnP) compliant devices to act as control points, wherein a UPnP device advertises its abilities and is controlled by a control point, while a control point listens or searches for devices it is capable of controlling and exerts control over those devices, wherein at least one of the plurality of information presentation appliances facilitates disparate types of presentations, wherein disparate types of presentations include audio and still images, wherein the information presentation appliance is selected from the group comprising an electronic picture frame or a speaker;

receiving user input via the at least one of the plurality of information presentation appliances, wherein user input comprises:

selecting at least one category of information to be presented on the appliance, wherein the at least one category comprises user-defined keywords and blocked keywords created and entered by the user to further specify the category selection and aid in identifying the category if there is no match to the category selection within the inter-appliance communication network;

specifying at least one user-defined blocked keyword to further identify categories that are not to be presented on the appliance;

specifying information to be blocked from presentation on the appliance if the information contains the user-defined blocked keyword;

creating a device description page using a markup language;

storing data representing the categories of information specified by the user and the user-defined keyword entered by the user in the device description page; and transmitting the device description page with the data representing the categories of information and the user-defined and created keywords from the at least one of the plurality of information presentation appliances via the inter-appliance communication network.

2. The method of claim 1 wherein the markup language is text-based.

3. The method of claim 1 wherein the markup language identifies an element with a tag, and wherein the tag is defined in a schema.

4. The method of claim 1 wherein information blocked from presentation on the information presentation appliance is audio information.

5. The method of claim 1 wherein information blocked from presentation on the information presentation appliance is video information.

6. The method of claim 1 wherein the receiving user input is at the information presentation appliance.

7. A method of tuning at least one of a plurality of information presentation appliances in an inter-appliance communication network, comprising:
  facilitating configuring at least one of the plurality of information presentation appliances defined as Universal Plug and Play (UPnP) compliant devices which formerly only acted as a device to act as a control point, wherein at least on of the plurality of information presentation appliances facilitates disparate types of presentations, wherein disparate types of presentations include audio and still images, wherein the information presentation appliance is selected from the group comprising an electronic picture frame or a speaker;
  receiving a device description page written in a markup language;
  parsing the device description page to identify available categories of information;
  presenting the available categories of information to a user;
  receiving user input via at least one of the plurality of information presentation appliances, wherein user input comprises:
    selecting at least one category of information to be presented on the appliances, wherein at least one category comprises user-defined keywords created and entered by the user and blocked keywords created and entered by the user to further specify the category selection and aid in identifying the category if there is no match to the category selection within the communication network;
    specifying selected categories of information to be blocked from presentation on the information presentation appliance;
    specifying at least one user-defined blocked keyword that indicates information to be blocked from presentation on the appliance if the information contains the user-defined blocked keyword; and
  invoking a deliver function referenced by a service description page to receive an element of information belonging to a category other than the selected categories of information, wherein the deliver function facilitates delivery of the element of information that is context and/or location specific.

8. The method of claim 7 wherein the information presentation appliance conforms to a Universal Plug and Play control point architecture.

9. The method of claim 7 wherein the markup language is text-based.

10. The method of claim 7 wherein information blocked from presentation on the information presentation appliance is audio information.

11. The method of claim 7 wherein information blocked from presentation on the information presentation appliance is video information.

12. The method of claim 7 wherein the parsing the device description page to identify the available categories of information comprises:
  identifying a service description page pointer to the service description page;
  requesting the service description page using the service description page pointer; and
  parsing the service description page to identify the available categories of information.

13. The method of claim 12 wherein the parsing the service description page to identify the available categories of information comprises:
  identifying a list function pointer to a list function, wherein the list function lists the available categories of information; and
  invoking the list function to list the available categories of information using the list function pointer.

14. The method of claim 13 wherein the invoking the list function to list the available categories of information comprises:
  receiving a list of identifiers of the available categories of information;
  identifying a name function pointer to a name function, wherein the name function provides names for the available categories of information; and
  invoking the name function for each identifier in the list of identifiers.

15. An information presentation appliance in an inter-appliance communication network, comprising:
  at least one of a plurality of information presentation appliances which were defined as Universal Plug and Play (UPnP) compliant devices are configured to act as control points, wherein a UPnP device advertises its abilities and is controlled by a control point, while a control point listens or searches for devices it is capable of controlling and exerts control over those devices, wherein at least one of the plurality of information presentation appliances facilitates disparate types of presentations, wherein disparate types of presentations include audio and still images, wherein the information presentation appliance is selected from the group comprising an electronic picture frame or a speaker
  a user input device for enabling a user to specify at least one category of information to be presented on the information presentation appliance, wherein at least one category comprises user-defined keywords created and entered by the user and blocked keywords created and entered by the user to further specify the category selection and aid in identifying the category if there is no match to the category selection within the communication network, and wherein
  the user input device enables the user to specify categories of information to be blocked from presentation on the information presentation appliance to key-in at least one user-defined blocked keyword that further specifies information to be blocked from presentation on the appliance if the information contains the user-defined keyword, wherein at least one of the categories is associated with the at least one user-defined blocked keyword;

a processing unit for creating a device description page written in a markup language and containing data representing the categories of information and the user-defined keywords and blocked keywords specified by the user through the user input device;

a memory storage for storing the device description page; and a network connection for transmitting the device description page.

16. The information presentation appliance of claim 15 wherein the information presentation appliance is a decoder device.

17. The information presentation appliance of claim 15 wherein the markup language is text-based.

18. The information presentation appliance of claim 15 wherein the markup language identifies an element with a tag, and wherein the tag is defined in a schema.

19. The information presentation appliance of claim 15 wherein the categories of information in the device description page are identified with extended tags, and wherein the extended tags are defined in an extended schema.

20. An information presentation appliance in an inter-appliance communication network, comprising:

a network connection for receiving a device description page written in a markup language;

at least one of a plurality of information presentation appliances which were defined as Universal Plug and Play (UPnP) compliant devices are configured to act as control points, wherein a UPnP device advertises its abilities and is controlled by a control point, while a control point listens or searches for devices it is capable of controlling and exerts control over those devices, wherein at least one of the plurality of information presentation appliances facilitates disparate types of presentations, wherein disparate types of presentations include audio and still images, wherein the information presentation appliance is selected from the group comprising an electronic picture frame or a speaker; the at least one of a plurality of information presentation appliances comprising:

a user input device for receiving user input specifying at least one category of information to be presented on the information presentation appliance, wherein at least one category comprises user-defined keywords created and entered by the user and blocked keywords created and entered by the user to further specify the category selection and aid in identifying the category if there is no match to the category selection within the communication network, and wherein the user input device receives user input specifying selected categories of information to be blocked from presentation on the information presentation appliance and at least one user-defined blocked keyword further specifying information to be blocked from presentation on the information presentation appliance if the information contains the user-defined blocked keyword, wherein at least one of the categories is associated with the at least one user-defined blocked keyword; and a processing unit for:

parsing the device description page to identify at least one available category of information and at least one user-defined keyword associated with the category; and invoking a deliver function referenced by a service description page to receive an element of information belonging to a category other than the selected categories of information.

21. The information presentation appliance of claim 20 wherein the information presentation appliance is a decoder device.

22. The information presentation appliance of claim 20 wherein the markup language is text-based.

23. The information presentation appliance of claim 20 wherein the available categories of information include the selected categories of information.

24. The information presentation appliance of claim 20 wherein parsing the device description page to identify the available categories of information further comprises:

identifying a service description page pointer to the service description page;

requesting the service description page using the service description page pointer; and parsing the service description page to identify the available categories of information.

25. The information presentation appliance of claim 24 wherein parsing the service description page to identify the available categories of information further comprises:

identifying a list function pointer to a list function, wherein the list function lists the available categories of information; and invoking the list function to list the available categories of information using the list function pointer.

26. The information presentation appliance of claim 25 wherein involving the list function to list the available categories of information further comprises:

receiving a list of identifiers of the available categories of information;

identifying a name function pointer to a name function, wherein the name function provides names for the available categories of information; and invoking the name function for each identifier in the list of identifiers.

27. A computer-readable storage medium having computer executable instructions for tuning an information presentation appliance in an inter-appliance communication network, the computer-executable instructions performing a process comprising:

facilitating in an inter-appliance communication network configuring at least one of a plurality of information presentation appliances which were defined as Universal Plug and Play (UPnP) compliant devices to act as control points, wherein a UPnP device advertises its abilities and is controlled by a control point, while a control point listens or searches for devices it is capable of controlling and exerts control over those devices, wherein at least one of the plurality of information presentation appliances facilitates disparate types of presentations, wherein disparate types of presentations include audio and still images, wherein the information presentation appliance is selected from the group comprising an electronic picture frame or a speaker;

receiving user input specifying at least one category of information to be presented on the information presentation appliance, wherein at least one category comprises user-defined keywords created and entered by the user and blocked keywords created and entered by the user to further specify the category selection and aid in identifying the category if there is no match to the category selection within the communication network, and wherein receiving user input specifies categories of information to be blocked from presentation on the information presentation appliance, wherein at least one of the categories is associated with at least one user-defined blocked keyword entered by a user, and wherein the user-defined blocked keyword further specifies information to be blocked from presentation on the appliance if the information contains the user-defined blocked keyword;

creating a device description page using a markup language;

storing data representing the categories of information and the user-defined keywords and blocked keywords entered by the user in the device description page; and transmitting the device description page with the categories of information through a network.

28. The computer-readable storage medium of claim 27 wherein the markup language is text-based.

29. The computer-readable storage medium of claim 27 wherein the markup language identifies an element with a tag, and wherein the tag is defined in a schema.

30. The computer-readable storage medium of claim 27 wherein the categories of information in the device description page are identified with extended tags, and wherein the extended tags are defined in an extended schema.

31. The computer-readable storage medium of claim 27 wherein the receiving user input is at the information presentation appliance.

32. A computer-readable storage medium having computer-executable instructions for tuning an information presentation appliance in an inter-appliance communication network, the computer-executable instructions performing a process comprising:

receiving a device description page written in a markup language;

parsing the device description page to identify available categories of information;

presenting the available categories of information to a user;

facilitating in an inter-appliance communication network configuring at least one of a plurality of information presentation appliances which were defined as Universal Plug and Play (UPnP) compliant devices to act as control points, wherein a UPnP device advertises its abilities and is controlled by a control point, while a control point listens or searches for devices it is capable of controlling and exerts control over those devices, wherein at least one of the plurality of information presentation appliances facilitates disparate types of presentations, wherein disparate types of presentations include audio and still images, wherein the information presentation appliance is selected from the group comprising an electronic picture frame or a speaker;

receiving user input via the at least one of the plurality of information presentation appliances, wherein user input comprises:

receiving user input at the information presentation appliance specifying at least one category of information to be presented on the information presentation appliance, wherein at least one category comprises user-defined keywords created and entered by the user and blocked keywords created and entered by the user to further specify the category selection and aid in identifying the category if there is no match to the category selection within the communication network;

receiving user input at the information presentation appliance specifying selected categories of information to be blocked from presentation on the information presentation appliance;

receiving further user input at the information presentation appliance specifying at least one user-defined blocked keyword that indicates information to be blocked from presentation on the appliance if the information contains the user-defined blocked keyword; and invoking a deliver function referenced by a service description page to receive an element of information belonging to a category other than the selected categories of information.

33. The computer-readable storage medium of claim 32 wherein the markup language is text-based.

34. The computer-readable storage medium of claim 32 wherein the available categories of information include the selected categories of information.

35. The computer-readable storage medium of claim 32 wherein the parsing the device description page to identify the available categories of information comprises:

identifying a service description page pointer to the service description page;

requesting the service description page using the service description page pointer; and parsing the service description page to identify the available categories of information.

36. The computer-readable storage medium of claim 35 wherein the parsing the service description page to identify the available categories of information comprises:

identifying a list function pointer to a list function, wherein the list function lists the available categories of information; and invoking the list function to list the available categories of information using the list function pointer.

37. The computer-readable storage medium of claim 36 wherein the invoking the list function to list the available categories of information comprises:

receiving a list of identifiers of the available categories of information;

identifying a name function pointer to a name function, wherein the name function provides names for the available categories of information; and invoking the name function for each identifier in the list of identifiers.

* * * * *